(12) United States Patent
Yamane

(10) Patent No.: US 12,437,930 B2
(45) Date of Patent: Oct. 7, 2025

(54) CERAMIC ELECTRONIC COMPONENT, METHOD FOR MANUFACTURING THE SAME, AND CIRCUIT BOARD

(71) Applicant: TAIYO YUDEN CO., LTD., Tokyo (JP)

(72) Inventor: Maiko Yamane, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 99 days.

(21) Appl. No.: 18/161,604

(22) Filed: Jan. 30, 2023

(65) Prior Publication Data

US 2023/0245833 A1 Aug. 3, 2023

(30) Foreign Application Priority Data

Feb. 3, 2022 (JP) ................... 2022-015310

(51) Int. Cl.
| | |
|---|---|
| *H01G 4/30* | (2006.01) |
| *H01G 2/06* | (2006.01) |
| *H01G 4/008* | (2006.01) |
| *H01G 4/012* | (2006.01) |
| *H01G 4/12* | (2006.01) |
| *H01G 4/224* | (2006.01) |

(52) U.S. Cl.
CPC ............... *H01G 4/30* (2013.01); *H01G 2/065* (2013.01); *H01G 4/008* (2013.01); *H01G 4/012* (2013.01); *H01G 4/1227* (2013.01); *H01G 4/224* (2013.01)

(58) Field of Classification Search
CPC ........... H01G 4/30; H01G 4/008; H01G 4/32; H01G 4/012; H01G 4/1227; H01G 4/224; H01G 2/065
See application file for complete search history.

(56) References Cited

U.S. PATENT DOCUMENTS

| | | | |
|---|---|---|---|
| 2010/0103586 A1* | 4/2010 | Tang | H01G 4/232 361/301.4 |
| 2013/0294009 A1 | 11/2013 | Takeuchi et al. | |

(Continued)

FOREIGN PATENT DOCUMENTS

| | | |
|---|---|---|
| JP | 2013-232606 A | 11/2013 |
| JP | 2014-116571 A | 6/2014 |

(Continued)

*Primary Examiner* — Michael P McFadden
(74) *Attorney, Agent, or Firm* — CHEN YOSHIMURA LLP

(57) ABSTRACT

A ceramic electronic component includes a multilayer body having internal electrode layers and dielectric layers alternately laminated, and a pair of external electrodes covering each of a pair of first corner portions extending between one surface and a pair of opposing surfaces adjacent to the one surface, wherein the pair of first corner portions each have an arc shape projecting outward when the laminating direction is viewed from front, each of the plurality of internal electrode layers has a substantially rectangular outer edge when the laminating direction is viewed from front, and each of the plurality of internal electrode layers includes a second corner portion exposed to one of the pair of first corner portions so as to be in contact with one of the pair of external electrodes, the arc-shaped second corner portion being positioned at one end of a side alongside the one surface of four sides.

11 Claims, 19 Drawing Sheets

(56) References Cited

U.S. PATENT DOCUMENTS

| | | | |
|---|---|---|---|
| 2014/0104750 A1* | 4/2014 | Ahn | H01G 4/30 |
| | | | 361/306.3 |
| 2014/0160615 A1 | 6/2014 | Lee et al. | |
| 2014/0160616 A1 | 6/2014 | Yoon et al. | |
| 2014/0160618 A1 | 6/2014 | Yoon et al. | |
| 2014/0160621 A1 | 6/2014 | Yoon et al. | |
| 2014/0177129 A1* | 6/2014 | Lee | H01G 4/35 |
| | | | 156/89.12 |
| 2015/0021073 A1* | 1/2015 | Kim | H01G 4/12 |
| | | | 174/258 |
| 2017/0169954 A1* | 6/2017 | Ota | H01G 4/232 |
| 2017/0278631 A1 | 9/2017 | Choi et al. | |
| 2017/0287641 A1* | 10/2017 | Wu | H01G 4/30 |
| 2019/0066921 A1* | 2/2019 | Cho | H01G 4/30 |
| 2021/0043383 A1* | 2/2021 | Lee | H01G 4/01 |

FOREIGN PATENT DOCUMENTS

| | | |
|---|---|---|
| JP | 2014-160691 A | 9/2014 |
| JP | 2014-160693 A | 9/2014 |
| JP | 2014-187055 A | 10/2014 |
| JP | 2017-175105 A | 9/2017 |

\* cited by examiner

CERAMIC ELECTRONIC COMPONENT, METHOD FOR MANUFACTURING THE SAME, AND CIRCUIT BOARD

FIELD

A certain aspect of the present disclosure relates to a ceramic electronic component, a method for manufacturing the same, and a circuit board.

BACKGROUND

With respect to a ceramic electronic component, for example, Patent Document 1 discloses a capacitor in which external electrodes are provided on a lower surface facing a mounting surface of a circuit board. The internal electrodes of this capacitor are provided with lead portions exposed on the lower surface for connection to the external electrodes.

PRIOR ART DOCUMENTS

Patent Document

[Patent Document 1] Japanese Patent Application Publication No. 2017-175105

SUMMARY OF THE INVENTION

When the circuit board on which the ceramic electronic component having the external electrodes on its lower surface is mounted as in the capacitor described above vibrates and flexes, a stress acts on end portions of the external electrodes so as to pull them toward the circuit board. This may cause the external electrodes to peel off from a ceramic multilayer body.

Further, in the ceramic electronic component in which the lead portions are provided in the internal electrodes as in the above-described capacitor, since the lead portions are drawn from substantially rectangular electrode regions to the external electrodes, it is necessary to provide large margins in the vicinity of the substantially rectangular electrode regions, which reduces a capacitance.

In view of the circumstances as described above, an object of the present invention is to provide a ceramic electronic component, a method for manufacturing the same, and a circuit board which are capable of suppressing the peeling of the external electrodes.

According to a first aspect of the embodiments, there is provided a ceramic electronic component including: a multilayer body having a substantially rectangular parallelepiped shape including a plurality of internal electrode layers and a plurality of dielectric layers alternately laminated; and a pair of external electrodes covering each of a pair of first corner portions extending between one surface and a pair of opposing surfaces adjacent to the one surface out of four surfaces of the multilayer body excluding both end surfaces in a laminating direction of the multilayer body; wherein the pair of first corner portions each have an arc shape projecting outward when the laminating direction of the multilayer body is viewed from front, each of the plurality of internal electrode layers has a substantially rectangular outer edge when the laminating direction of the multilayer body is viewed from front, and each of the plurality of internal electrode layers includes an arc-shaped second corner portion exposed to one of the pair of first corner portions so as to be in contact with one of the pair of external electrodes, the arc-shaped second corner portion being positioned at one end of a side alongside the one surface of four sides forming the substantially rectangular outer edge.

In the ceramic electronic component, a length of an outer edge, where the second corner is exposed, of one of the pair of first corner portions covered with one of the pair of external electrodes when the laminating direction of the multilayer body is viewed from front may be equal to or less than a length of another outer edge on both sides of the outer edge.

In the ceramic electronic component, the pair of first corner portions may be curved in an arc shape when the laminating direction of the multilayer body is viewed from front.

In the ceramic electronic component, a radius of each of the pair of first corner portions may be 52.5 to 100 μm.

In the ceramic electronic component, a radius of each of the pair of first corner portions may be 30% or less of a height of the multilayer body having the one surface as a bottom surface.

In the ceramic electronic component, a radius of curvature of each of the pair of first corner portions may be 10 to 20% of a height of the multilayer body having the one surface as a bottom surface.

The ceramic electronic component may include a third corner portion cut out at the other end of the side alongside the one surface so as not to contact with the other of the pair of external electrodes.

In the ceramic electronic component, a minimum distance between the third corner portion and the other of the pair of external electrodes may be 15 μm or more.

In the ceramic electronic component, a minimum distance between the third corner portion and the other of the pair of external electrodes may be 19 μm or more.

In the ceramic electronic component, a minimum distance between the third corner portion and the other of the pair of external electrodes may be 20 μm or more.

According to a second aspect of the embodiments, there is provided a method for manufacturing a ceramic electronic component including: preparing a dielectric green sheet; printing a substantially rectangular internal electrode pattern on a surface of the dielectric green sheet with a metal conductive paste; forming a multilayer body having a substantially rectangular parallelepiped shape by laminating the dielectric green sheets having the internal electrode pattern printed thereon; polishing the multilayer body; and forming a pair of external electrodes so as to respectively cover a pair of first corner portions extending between one surface and a pair of opposing surfaces adjacent to the one surface out of four surfaces of the multilayer body excluding both end surfaces in a laminating direction of the multilayer body; wherein the polishing includes: rounding each of the pair of first corner portions into an arc shape projecting outward when the laminating direction of the multilayer body is viewed from front; and rounding a second corner portion into an arc shape projecting outward to expose the second corner portion to one of the pair of first corner portions, the second corner portion being positioned at one end of a side alongside the one surface of four sides forming the substantially rectangular outer edge.

In the method for manufacturing the ceramic electronic component, the polishing may include rounding the pair of first corner portions into an arc shape when the laminating direction of the multilayer body is viewed from front.

In the method for manufacturing the ceramic electronic component, the printing may include forming, in the internal electrode pattern, a third corner portion cut off at the other end of the side alongside the one surface so as not to contact with the other of the pair of external electrodes.

According to a third aspect of the embodiments, there is provided a circuit board including: a multilayer ceramic electronic component mounted on the circuit board; the multilayer ceramic electronic component including: a multilayer body having a substantially rectangular parallelepiped shape including a plurality of internal electrode layers and a plurality of dielectric layers alternately laminated; and a pair of external electrodes covering each of a pair of first corner portions extending between one surface and a pair of opposing surfaces adjacent to the one surface out of four surfaces of the multilayer body excluding both end surfaces in a laminating direction of the multilayer body; wherein the pair of first corner portions each have an arc shape projecting outward when the laminating direction of the multilayer body is viewed from front, each of the plurality of internal electrode layers has a substantially rectangular outer edge when the laminating direction of the multilayer body is viewed from front, each of the plurality of internal electrode layers includes an arc-shaped second corner portion exposed to one of the pair of first corner portions so as to be in contact with one of the pair of external electrodes, the arc-shaped second corner portion being positioned at one end of a side alongside the one surface of four sides forming the substantially rectangular outer edge, and the pair of external electrodes each have a crescent shape along the pair of first corners when the laminating direction of the multilayer body is viewed from front, and are connected to the circuit board by a solder extending along the pair of external electrodes toward the pair of opposing surfaces.

DETAILED DESCRIPTION

Embodiment (Configuration of Multilayer Ceramic Capacitor)

Figure 1:
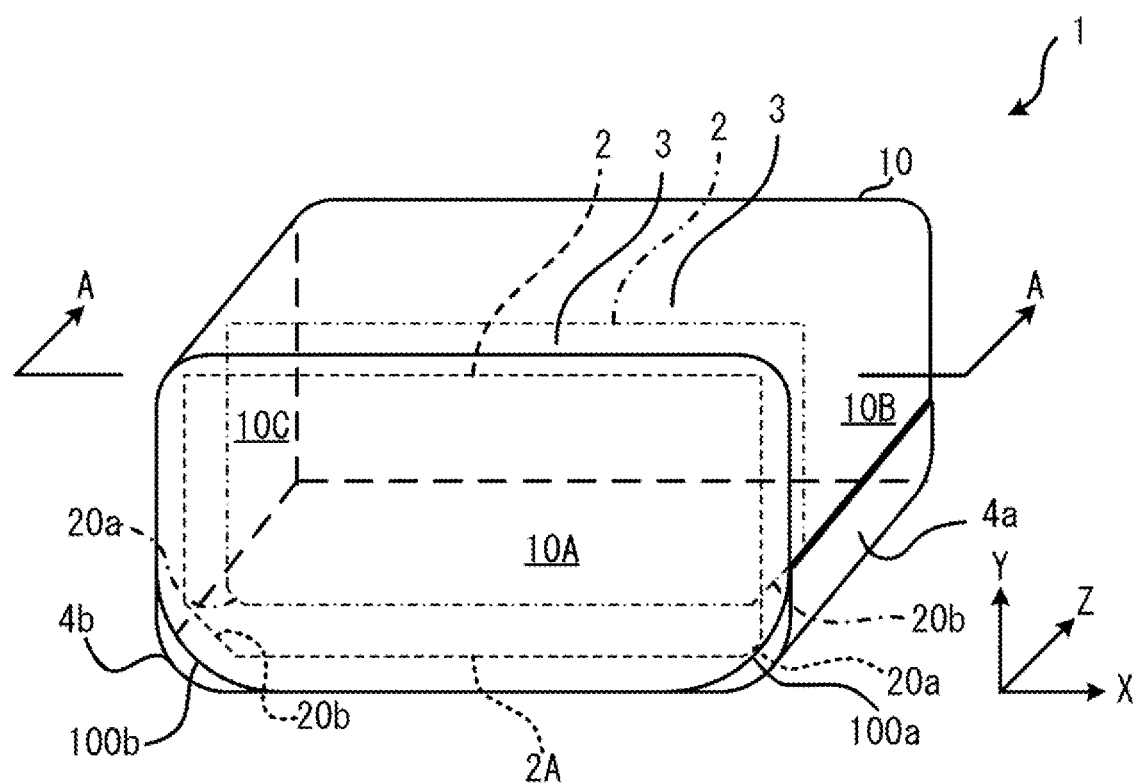
FIG. 1 is a perspective view illustrating a multilayer ceramic capacitor according to an embodiment.
Figure 2:
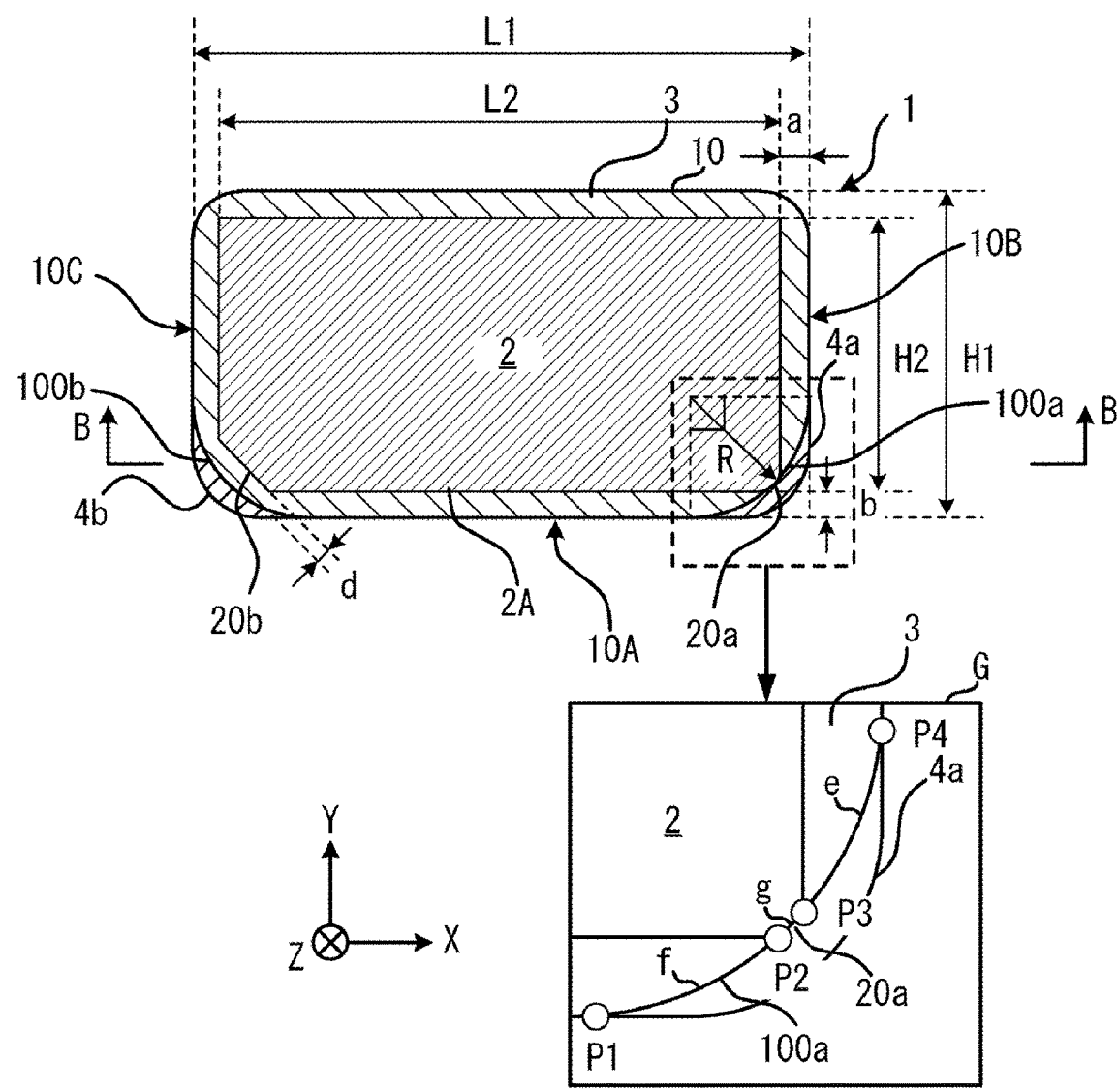
FIG. 2 is a cross-sectional view of the multilayer ceramic capacitor taken along line A-A of FIG. 1.
Figure 3:
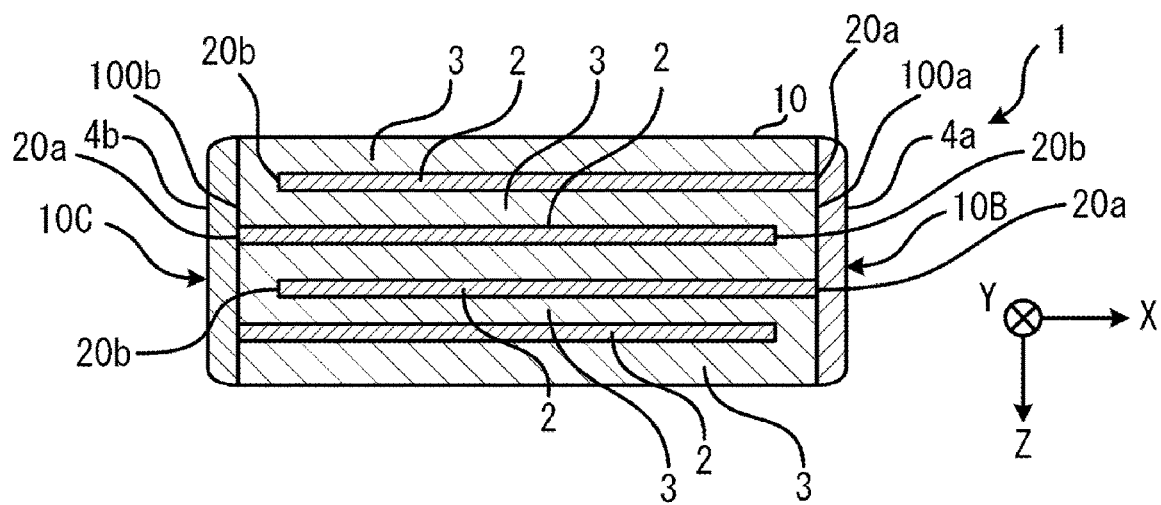
FIG. 3 is a cross-sectional view of a multilayer ceramic capacitor taken along line B-B of FIG. 2.

FIG. 1 is a perspective view illustrating a multilayer ceramic capacitor 1 according to the present embodiment. FIG. 2 is a cross-sectional view of the multilayer ceramic capacitor 1 taken along line A-A in FIG. 1. FIG. 3 is a cross-sectional view of the multilayer ceramic capacitor 1 taken along line B-B in FIG. 2. In FIGS. 1 to 3, a Z-axis indicates a stacking direction of the multilayer ceramic capacitor 1. An X-axis and a Y-axis are directions in which two sets of opposing surfaces other than both end surfaces in the laminating direction of the multilayer ceramic capacitor 1 face each other.

The multilayer ceramic capacitor 1, which is an example of a ceramic electronic component, has a multilayer chip 10 having a substantially rectangular parallelepiped shape and a pair of external electrodes 4a and 4b respectively covering a pair of corner portions 100a and 100b on both sides of a lower surface 10A of the multilayer chip 10. The multilayer chip 10 is an example of a multilayer body and includes a plurality of internal electrode layers 2 and a plurality of dielectric layers 3 which are alternately laminated. Here, each of the dielectric layers 3 located at both ends in the laminating direction of the multilayer chip 10 functions as a cover layer. Each internal electrode layer 2 includes a base metal material, and each dielectric layer 3 includes a ceramic material as a main component.

The dielectric layer 3 has, for example, a ceramic material having a perovskite structure represented by a general formula $ABO_3$ as a main phase. The perovskite structure contains $ABO_3$-α which is out of the stoichiometric composition. For example, the ceramic material can be selected from at least one of $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), and $Ba_{1-x-y}Ca_xSr_yTi_{1-z}Zr_zO_3$ ($0 \leq x \leq 1$, $0 \leq y \leq 1$, $0 \leq z \leq 1$) forming the perovskite structure. $Ba_{1-x-y}Ca_xSr_yTi_{1-z}Zr_zO_3$ includes barium strontium titanate, barium calcium titanate, barium zirconate, barium zirconate titanate, calcium zirconate titanate, and barium calcium zirconate titanate.

The internal electrode layer 2 is contains a base metal such as Ni (nickel), Cu (copper) and Sn (tin) as a main component. As the internal electrode layer 2, a noble metal such as Pt (platinum), Pd (palladium), Ag (silver), Au (gold), or an alloy containing these metals may be used.

The external electrodes 4a and 4b contain Ni, Cu or the like as a main component. On the surfaces of the external electrodes 4a and 4b, a plating layer containing a metal such as Cu, Ni, Al, Zn, Sn or an alloy of two or more of these metals as a main component may be provided.

The pair of corner portions 100a and 100b is an example of a pair of first corner portions and extends between the lower surface 10A and a pair of side surfaces 10B and 10C adjacent to the lower surface 10A. Here, the lower surface 10A is one surface facing a mounting surface of a circuit board (not illustrated) among four surfaces other than both end surfaces in the laminating direction (Z-axis direction) of the multilayer chip 10. The pair of corner portions 100a and 100b are curved in arc shapes projecting outward when the laminating direction of the multilayer chip 10 is viewed from front. Therefore, the external electrodes 4a and 4b also have rounded crescent shapes along the corner portions 100a and 100b, respectively, when the laminating direction of the multilayer chip 10 is viewed from front.

For example, as illustrated in FIG. 2, each of the corner portions 100a and 100b has an outer edge of a fan-shaped arc having a radius R and a central angle of 90 degrees. That is, the corner portions 100a and 100b are curved in arc shapes. The outer edges of the corner portions 100a and 100b are not limited to the arc shapes and may have other rounded shapes.

Each internal electrode layer 2 has a substantially rectangular outer edge when the laminating direction (Z-axis direction) of the multilayer chip 10 is viewed from front. Each internal electrode layer 2 includes a corner portion 20a which is exposed to one corner portion 100a of the multilayer chip 10 at one end of a side 2A on the lower surface 10A side among four sides forming an approximately rectangular outer edge, and a corner portion 20b which is separated from the other corner portion 100b of the multilayer chip 10 at the other end of the side 2A on the lower surface 10A side.

One corner portion 20a is an example of a second corner portion and is exposed to one corner portion 100a of the multilayer chip 10 so as to be in contact with the external electrode 4a. The corner portion 20a has an arcuate outer edge along the corner portion 100a of the multilayer chip 10.

The other corner portion 20b is an example of a third corner portion and is cut out so as not to contact with the other external electrode 4b. For example, the corner portion 20b has a shape obtained by cutting a square corner into a triangular shape, but is not limited to this shape as described later.

As illustrated in FIG. 3, the plurality of internal electrode layers 2 are alternately connected to a pair of external electrodes 4a and 4b along the laminating direction of the multilayer chip 10. Therefore, one corner portion 20a of each internal electrode layer 2 is alternately exposed to the pair of corner portions 100a and 100b of the multilayer chip 10 along the laminating direction. Further, the other corner portion 20b of each internal electrode layer 2 is alternately separated from the outer edges of the pair of corner portions 100a and 100b of the multilayer chip 10 along the laminating direction.

(Dimensions)

Next, the dimensions of each portion of the multilayer ceramic capacitor 1 of the present embodiment will be described. A width L1 of the multilayer chip 10 is, for example, 1000 μm or less, and a height H1 of the multilayer chip 10 having the lower surface 10A as a bottom surface is, for example, 500 μm or less. A width L2 of the internal electrode layer 2 is, for example, 970 μm or less, and a height H2 of the internal electrode layer 2 is, for example, 470 μm or less. Widths a and b of the margins of the dielectric layer 3 in the X-axis direction and the Y-axis direction with respect to the internal electrode layer 2 are, for example, 15 (μm) or more. A minimum distance d between the external electrode 4b and the corner portion 20b of the internal electrode layer 2 is, for example, 20 μm or less, and thicknesses of the external electrodes 4a and 4b are, for example, 2 μm on average.

The radius R of the arc-shaped outer edges of the corner portions 100a and 100b is, for example, 52.5 μm to 100 μm. As a result, peeling of the external electrode 4a can be suppressed as described later. In addition, the radius R is preferably 30% or less of the height H1 of the multilayer chip 10 so that other corners of the multilayer chip 10 are not excessively rounded when the corner portions 100a and 100b are formed by, for example, barrel polishing or the like described later.

When the corner portions 100a and 100b have round shapes other than arc shapes, the radius R thereof is defined as a radius of curvature. At this time, the radius R is preferably in the range of, for example, 10 to 20% of the height H1 of the multilayer ceramic capacitor 1 so that the other corners of the multilayer chip 10 are not excessively rounded as described above.

The minimum distance d between the external electrode 4b and the corner portion 20b of the internal electrode layer 2 is, for example, 15 μm or more. Preferably, the minimum distance d is 19 μm or more, and more preferably, the minimum distance d is 20 μm more. As the minimum distance d becomes larger as described later, occurrence of a short circuit between the corner portion 20b having the cutout shape in the internal electrode layer 2 and the external electrode 4b can be suppressed.

Reference symbol G is an enlarged view of the vicinity of the corner portion 100a covered with the external electrode 4a. Among the outer edges of the corner portion 100a, the length of the outer edge (between points P2 and P3) where the corner portion 20a of the internal electrode layer 2 is exposed is defined as "g", and the lengths of the other outer edges on both sides of "g" (between points P1 and P2 and between points P3 and P4) are defined as "f" and "e", respectively. In this embodiment, the length "g" of the outer edge at which the corner portion 20a of the internal electrode layer 2 is exposed is equal to or less than the respective lengths "e" and "f" on both sides of the outer edge, or longer than the respective lengths "e" and "f".

(Effect)

Next, the effect of the multilayer ceramic capacitor 1 will be described. In the multilayer ceramic capacitor 1, the internal electrode layer 2 has a substantially rectangular shape and is in contact with one of external electrodes 4a, 4b at the corner portion 20a of the lower surface 10A of the multilayer chip 10. Therefore, the internal electrode layer 2 does not need a lead portion extending from a substantially rectangular conductor region to the external electrodes 4a and 4b.

Therefore, the area of the internal electrode layer 2 can be set larger than that of other multilayer ceramic capacitors having lead portions as disclosed in the above-mentioned Patent Document 1. Thus, the capacitance of the multilayer ceramic capacitor 1 can be increased.

In addition, the multilayer ceramic capacitor 1 can suppress the peeling of the external electrodes 4a and 4b as described below.

Figure 4:
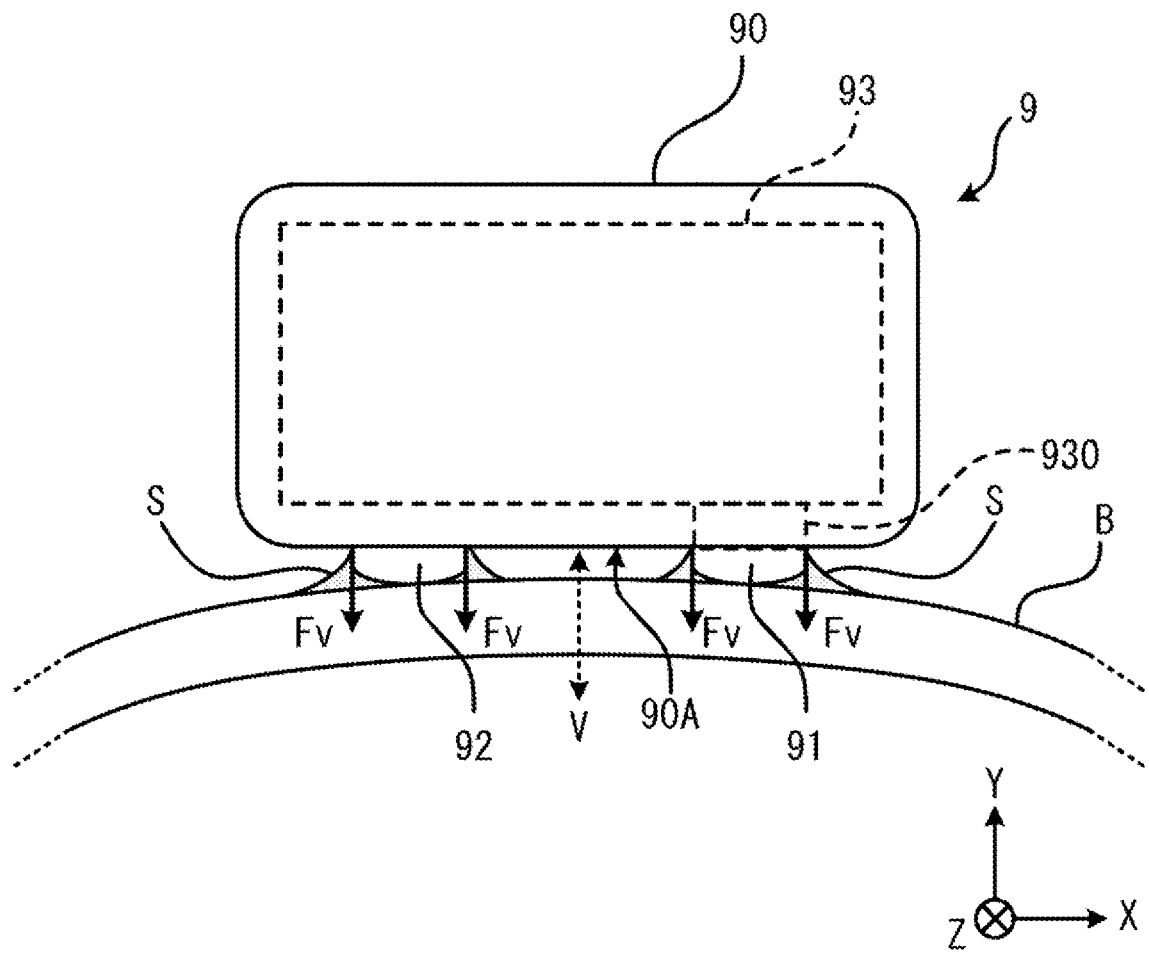
FIG. 4 is a front view illustrating an example of stresses applied to external electrodes of a multilayer ceramic capacitor according to a comparative example when a circuit board vibrates.

FIG. 4 is a front view illustrating an example of stresses Fv applied to external electrodes 91 and 92 of a multilayer ceramic capacitor 9 according to a comparative example when a circuit board vibrates. The multilayer ceramic capacitor 9 is mounted on a circuit board B.

The multilayer ceramic capacitor 9 has a multilayer chip 90 in which a plurality of internal electrode layers 93 and a plurality of dielectric layers are alternately laminated, and a pair of external electrodes 91 and 92 provided on a lower surface 90A of the multilayer chip 90.

Each of the plurality of internal electrode layers 93 has a rectangular shape and is alternately connected to the pair of external electrodes 91 and 92 along the laminating direction of the multilayer chip 90. Each internal electrode layer 93 is connected to the external electrode 91 or 92 via a rectangular lead portion 930. Although only the internal electrode layer 93 connected to one external electrode 91 is illustrated in FIG. 4, another internal electrode layer 93 is also connected to the other external electrode 92 via the lead portion 930.

The lower surface 90A of the multilayer chip 90 faces the mounting surface of the circuit board B. The external electrodes 91 and 92 are connected to conductor patterns (not illustrated) of the circuit board B by a solder S.

When the circuit board B vibrates and flexes as indicated by an arrow V, the stresses Fv are applied to both ends of each of the external electrodes 91 and 92 in a direction substantially perpendicular to the lower surface 90A. Therefore, each of the external electrodes 91 and 92 is pulled toward the circuit board B and may peel off from ceramic in the multilayer chip 90.

Figure 5:
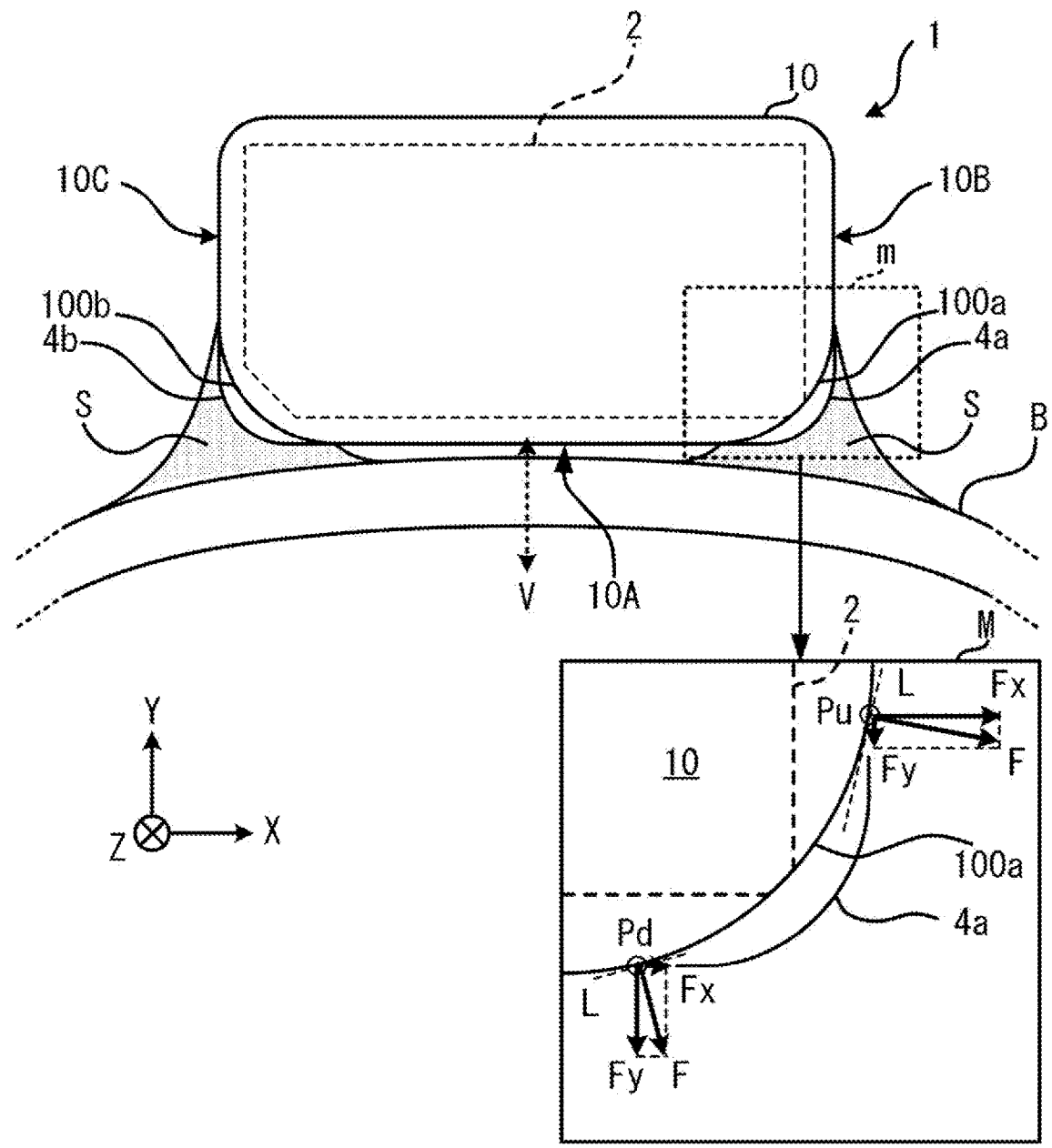
FIG. 5 is a front view illustrating an example of stresses applied to the external electrodes of the multilayer ceramic capacitor according to the present embodiment when the circuit board vibrates.

FIG. 5 is a front view illustrating an example of stresses F applied to the external electrodes 4a and 4b of the multilayer ceramic capacitor 1 according to the present embodiment when the circuit board B vibrates. In FIG. 5, the same components as those in FIG. 2 are denoted by the same reference numerals, and the description thereof is omitted.

The multilayer ceramic capacitor 1 is mounted on the circuit board B. The external electrodes 4a and 4b of the multilayer ceramic capacitor 1 are connected to the circuit board B via the solder S. The external electrodes 4a and 4b each have a crescent shape along the corner portions 100a and 100b having an arc shape projecting outward. The solder S covers the external electrodes 4a, 4b so as to spread between the lower surface 10A and the side surfaces 10B and 10C of the multilayer chip 10, and gets wet from the circuit board B toward the side surfaces 10B and 10C along the surfaces of the external electrodes 4a and 4b.

In this manner, the external electrodes 4a and 4b are connected by the solder S extending toward the side surfaces 10B and 10C. Therefore, the multilayer ceramic capacitor 1 can be connected to the circuit board B with sufficient strength by securing a large amount of solder S along the external electrodes 4a and 4b. On the other hand, since the external electrodes 91 and 92 of the multilayer ceramic capacitor 9 are formed in a substantially flat plate shape on the lower surface 90A, the solder S exists only in the lower portion of the lower surface 90A of the multilayer chip 90, and the amount thereof is smaller than that of the multilayer ceramic capacitor 1. Therefore, the strength of connection of the multilayer ceramic capacitor 1 to the circuit board B is higher than that of the multilayer ceramic capacitor 2.

When the circuit board B vibrates and flexes as indicated by the arrow V, the stresses F are applied to both ends of each of the external electrodes 4a and 4b in directions substantially perpendicular to the surfaces of the corner portions 100a and 100b.

Reference numeral M denotes an enlarged view of a region "m" in the vicinity of one corner portion 100a. In the enlarged view, the solder S is not illustrated. Stresses F act on end points Pu and Pd on both sides of each external electrode 4a in directions substantially perpendicular to tangent lines L at an arc-shaped outer edge of the corner portion 100a. Here, the end points Pu and Pd are located on a curved surface between both ends of an arc forming an outer edge of the corner portion 100a.

Therefore, the stress F applied to each of the end points Pu and Pd can be decomposed into the component force Fx in the X-axis direction and the component force Fy in the Y-axis direction. In this way, since the stress F at each of the end points Pu and Pd is dispersed, the force of pulling the external electrode 4a from the multilayer chip 10 is reduced. Thus, the peeling of the external electrode 4a is suppressed. The peeling of the other external electrode 4b is also suppressed by the same action as described above.

As described above, according to the multilayer ceramic capacitor 1, the capacitance can be increased and the peeling of the external electrodes 4a and 4b can be suppressed. In the internal electrode layer 2 of the multilayer ceramic capacitor 1, the cutout shape of the corner portion 20b not in contact with the external electrodes 4a and 4b is not limited.

Figure 6:
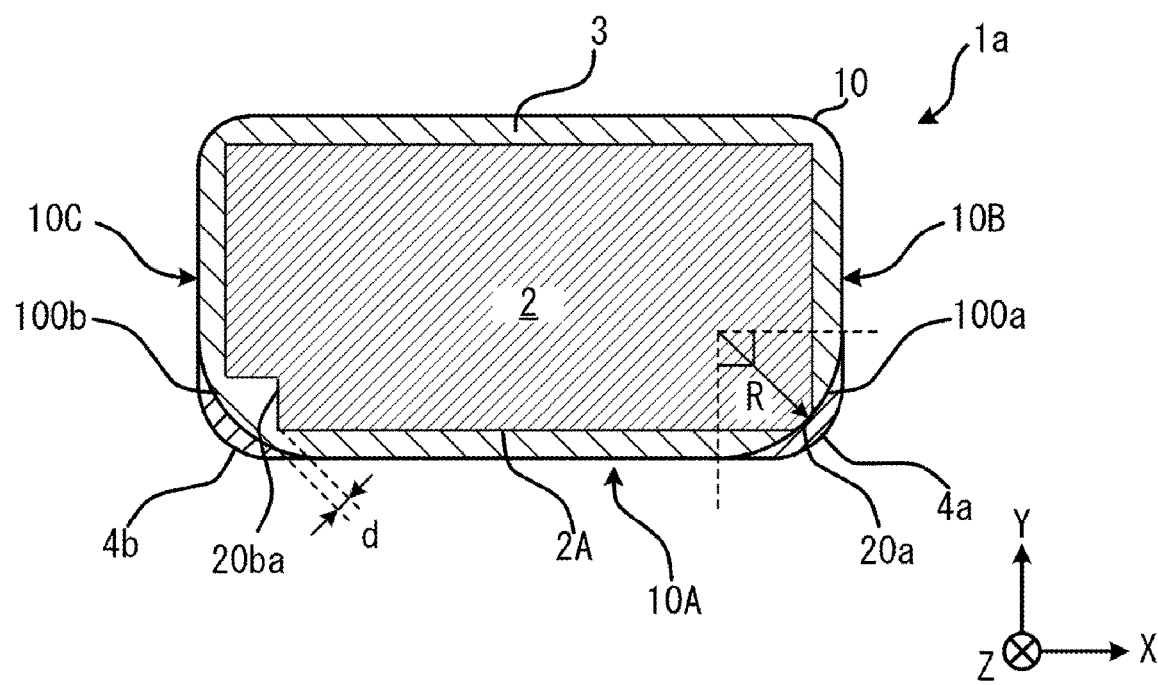
FIG. 6 is a cross-sectional view of another multilayer ceramic capacitor having different cutout shapes at the corners of the internal electrode layers.
Figure 7:
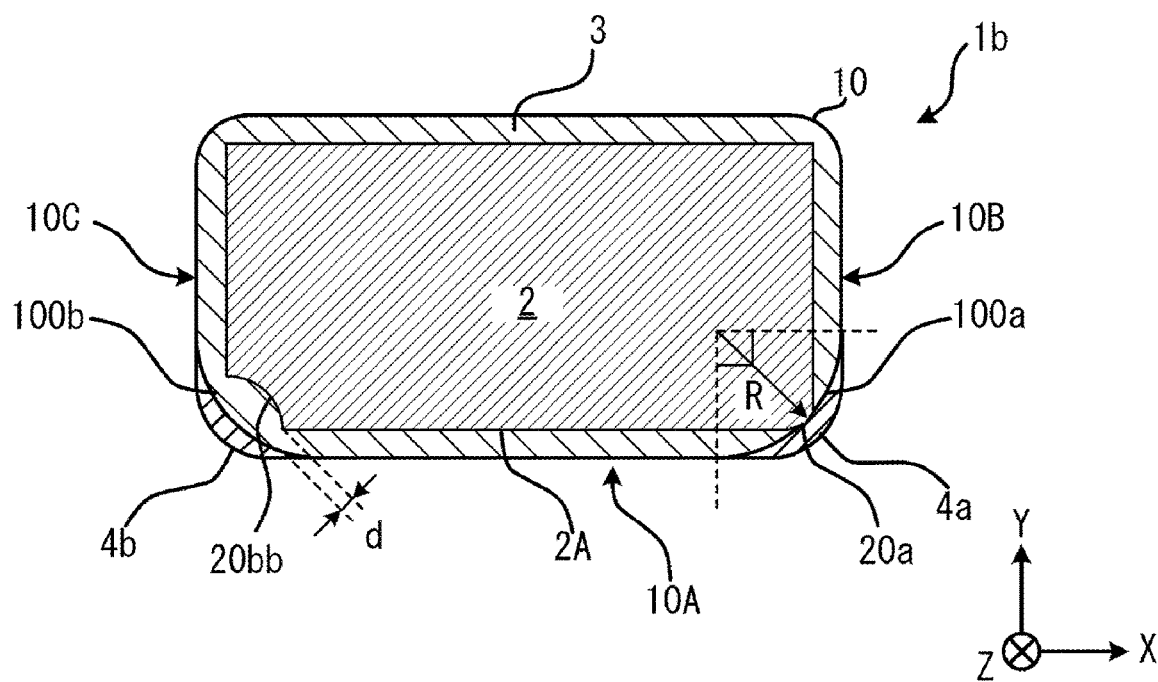
FIG. 7 is a cross-sectional view of another multilayer ceramic capacitor having different cutout shapes at the corners of the internal electrode layers.
Figure 8:
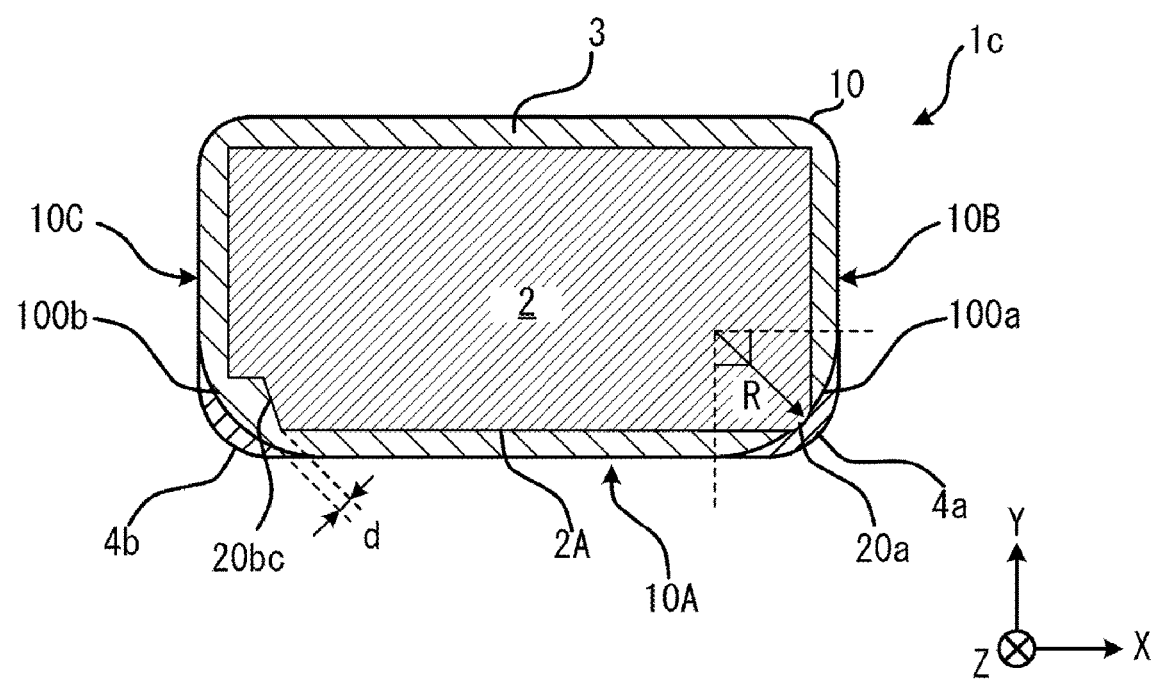
FIG. 8 is a cross-sectional view of another multilayer ceramic capacitor having different cutout shapes at the corners of the internal electrode layers.

FIGS. 6 to 8 are cross-sectional views of other multilayer ceramic capacitors 1a to 1c having different cutout shapes of corner portions 20 ba to 20 bc of the internal electrode layer 2. In FIGS. 6 to 8, the same components as those in FIG. 2 are denoted by the same reference numerals, and the description thereof is omitted.

In each of the examples illustrated in FIGS. 6 to 8, the outer edge shape of the corner portion 20a in contact with the external electrode 4a is an arc shape similar to that of the multilayer ceramic capacitor 1. The corner portions 20 ba to 20 bc are examples of third corner portions and are cut away so as not to contact with the other external electrode 4b.

The corner portion 20ba illustrated in FIG. 6 has a shape obtained by cutting a corner of a square into a square shape. The corner portion 20bb in FIG. 7 has a shape obtained by cutting a square corner into a fan shape having a center angle of 90 degrees. The corner portion 20bc in FIG. 8 has a shape obtained by cutting a square corner into a trapezoid shape. As described above, since the corner portions 20ba to 20bc have cutout shapes, respectively, they can be isolated from the external electrode 4b. In each example, the minimum distance d is the shortest distance between the corner portions 20ba to 20bc and the external electrode 4b.

(Manufacturing Step of Multilayer Ceramic Capacitor)

Figure 9:
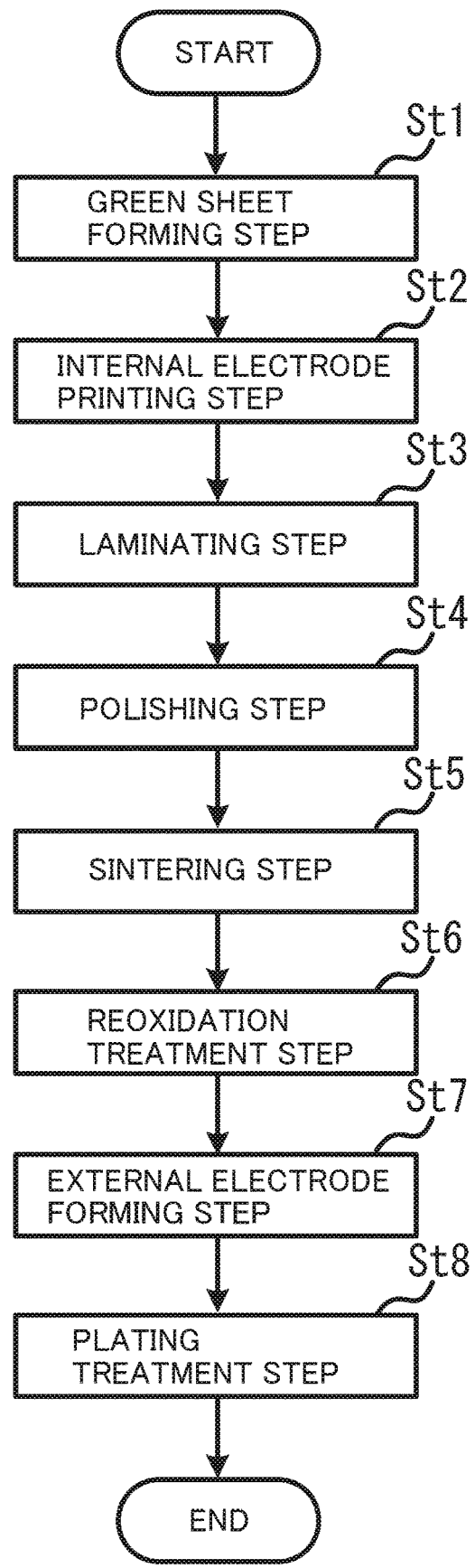
FIG. 9 illustrates an example of a manufacturing process of the multilayer ceramic capacitor.

FIG. 9 illustrates an example of a manufacturing process of the multilayer ceramic capacitors 1, 1a to 1c. The manufacturing process of the multilayer ceramic capacitors 1, 1a to 1c is an example of a method for manufacturing the ceramic electronic component.

(Green Sheet Forming Step)

First, a green sheet forming step St1 is performed. The green sheet forming step St1 is an example of a step of preparing a dielectric green sheet.

For example, in the green sheet forming step St1, a binder such as polyvinyl butyral (PVB) resin, an organic solvent such as ethanol and toluene, and a plasticizer are added to a dielectric material obtained by adding various kinds of additive compounds (such as a sintering aid) to a ceramic powder, and wet mixed. Using the obtained slurry, a dielectric green sheet having a thickness of 4 µm or more, for example, is coated on a base material by a die coater method or a doctor blade method, for example, and then dried. The base material is, for example, a PET (polyethylene terephthalate) film.

Oxides of Mg (magnesium), Mn (manganese), V (vanadium), Cr (chromium), oxides of rare earth elements (Y (yttrium), Sm (samarium), Eu (europium), Gd (gadolinium), Tb (terbium), Dy (dysprosium), Ho (holmium), Er (erbium), Tm (thulium) er (erbium), Tm (thulium) and Yb (ytterbium), and oxides or glasses of Co (cobalt), Ni, Li (lithium), B (boron), Na (sodium), K (potassium) and Si (silicon) are used as the additive compounds of the ceramic powders.
(Internal Electrode Printing Step)

Next, an internal electrode printing step St2 is performed. The internal electrode printing step St2 is an example of a step of printing an approximately rectangular internal electrode pattern on the surface of the dielectric green sheet with a metal conductive paste. In the internal electrode printing step St2, the metal conductive paste for forming the internal electrodes containing an organic binder is printed on the dielectric green sheet on the base material by screen printing, gravure printing, or the like, thereby forming the plurality of internal electrode patterns separated from each other. Ceramic particles are added to the metal conductive paste as a common material. The main component of the ceramic particle is not particularly limited, but it is preferably the same as the main component ceramic of the dielectric layer 3.

Figure 10:
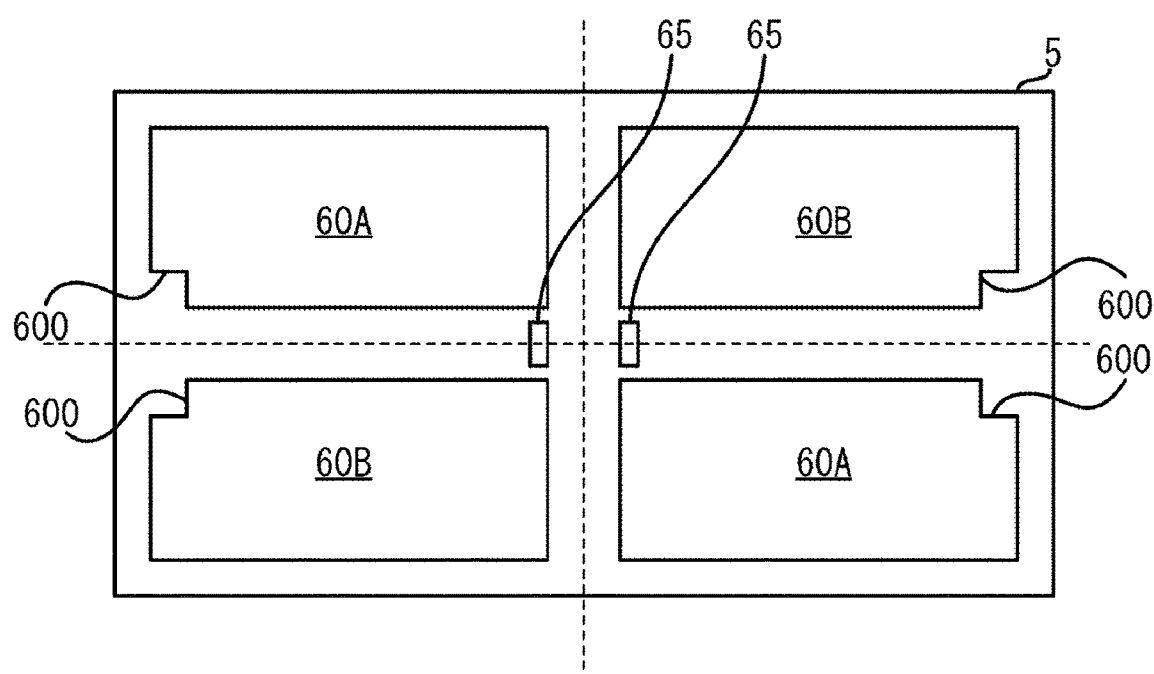
FIG. 10 is a plan view illustrating an example of a dielectric green sheet on which internal electrode patterns are printed.

FIG. 10 is a plan view illustrating an example of a dielectric green sheet 5 on which internal electrode patterns 60A and 60B are printed. In this example, the dielectric green sheet 5 corresponding to the internal electrode layer 2 with the corner portion 20ba having the square cutout shape illustrated in FIG. 6 is described. In a laminating step St3, the dielectric green sheet 5 is cut along the dotted line in the drawing.

As an example, four internal electrode patterns 60A and 60B are printed on the dielectric green sheet 5. Each of the internal electrode patterns 60A and 60B has a substantially rectangular shape. Each of the internal electrode patterns 60A and 60B includes a square cutout 600. The cutout 600 corresponds to the corner portion 20ba of the internal electrode layer 2.

The internal electrode pattern 60A and the internal electrode pattern 60B differ from each other in the position of the cutout 600 in the substantially rectangular shape. Therefore, when the multilayer chip 10 is formed in the laminating step St3, the internal electrode patterns 60A and 60B are alternately laminated. Thus, the corner portions 20ba of the internal electrode layer 2 are alternately provided at one end of the side 2A on the lower surface 10A side along the laminating direction of the multilayer chip 10.

Identification marks 65 are printed on the dielectric green sheet 5. The identification marks 65 are used to identify a laminating surface in the laminating step St3. The internal electrode patterns 60A and 60B are not limited to this example. For example, the internal electrode patterns may be adjacent to each other without being separated by a margin as in the following example.

Figure 11:
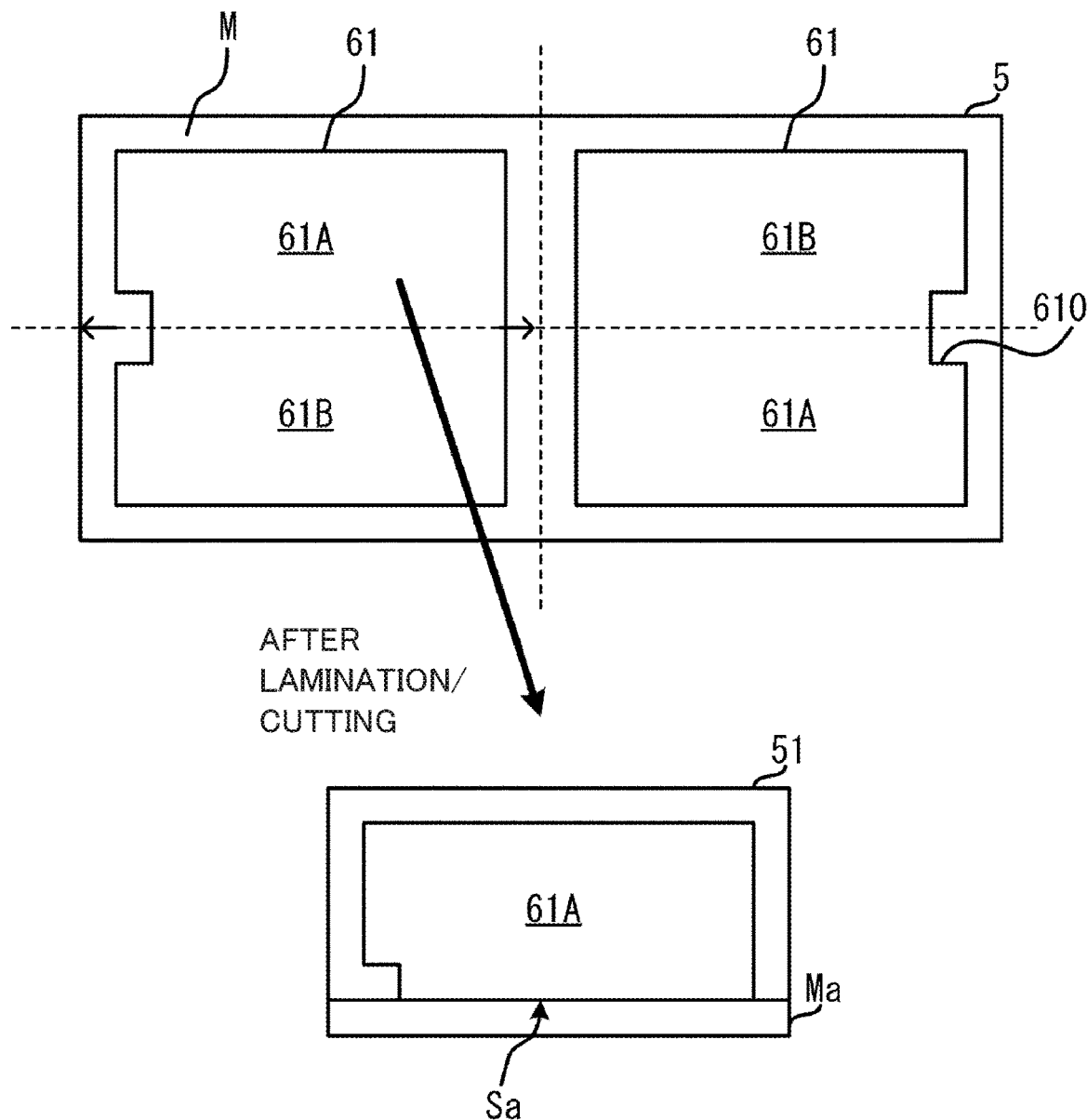
FIG. 11 is a plan view illustrating another example of a dielectric green sheet on which internal electrode patterns are printed.

FIG. 11 is a plan view illustrating another example of the dielectric green sheet 5 on which internal electrode patterns 61A and 61B are printed. In FIG. 11, the same components as those in FIG. 10 are denoted by the same reference numerals, and the description thereof is omitted.

On the dielectric green sheet 5, two one-sided adjacent patterns 61 including a set of internal electrode patterns 61A and 61B are printed. The internal electrode patterns 61A and 61B have the same shape as the internal electrode patterns 60A and 60B, respectively. In the one-sided adjacent pattern 61, the set of internal electrode patterns 61A and 61B are adjacent to each other so as to share one side indicated by an arrow. A margin portion M in which the dielectric is exposed is not provided in the adjacent portion.

Further, the one-sided adjacent pattern 61 has a rectangular cutout 610. The cutout 610 corresponds to the corner portion 20ba of the internal electrode layer 2 obtained from each of the internal electrode patterns 61A and 61B.

The internal electrode pattern 61A and the internal electrode pattern 61B are different from each other in the position of the cutout 610 in the substantially rectangular shape. Therefore, when the multilayer chip 10 is formed in the laminating step St3, the internal electrode patterns 61A and 61B are alternately laminated. Thus, the corner portions 20ba of the internal electrode layer 2 are alternately provided at one end of the side 2A on the lower surface 10A side along the laminating direction of the multilayer chip 10.

A reference numeral 51 denotes a dielectric layer of the internal electrode pattern 61A after a plurality of dielectric green sheets 5 are laminated and cut in units of multilayer chips 10. On a cut surface Sa corresponding to one side shared with the other internal electrode pattern 61B, a side margin portion Ma having a height and a predetermined thickness in accordance with the multilayer chip 10 is bonded. The side margin portion Ma is formed as a dielectric sheet having the same composition as that of the dielectric green sheet 5. The side margin portion Ma is bonded to the cut surface through another bonding sheet (not illustrated) having the same composition as that of the side margin portion Ma.

Figure 12:
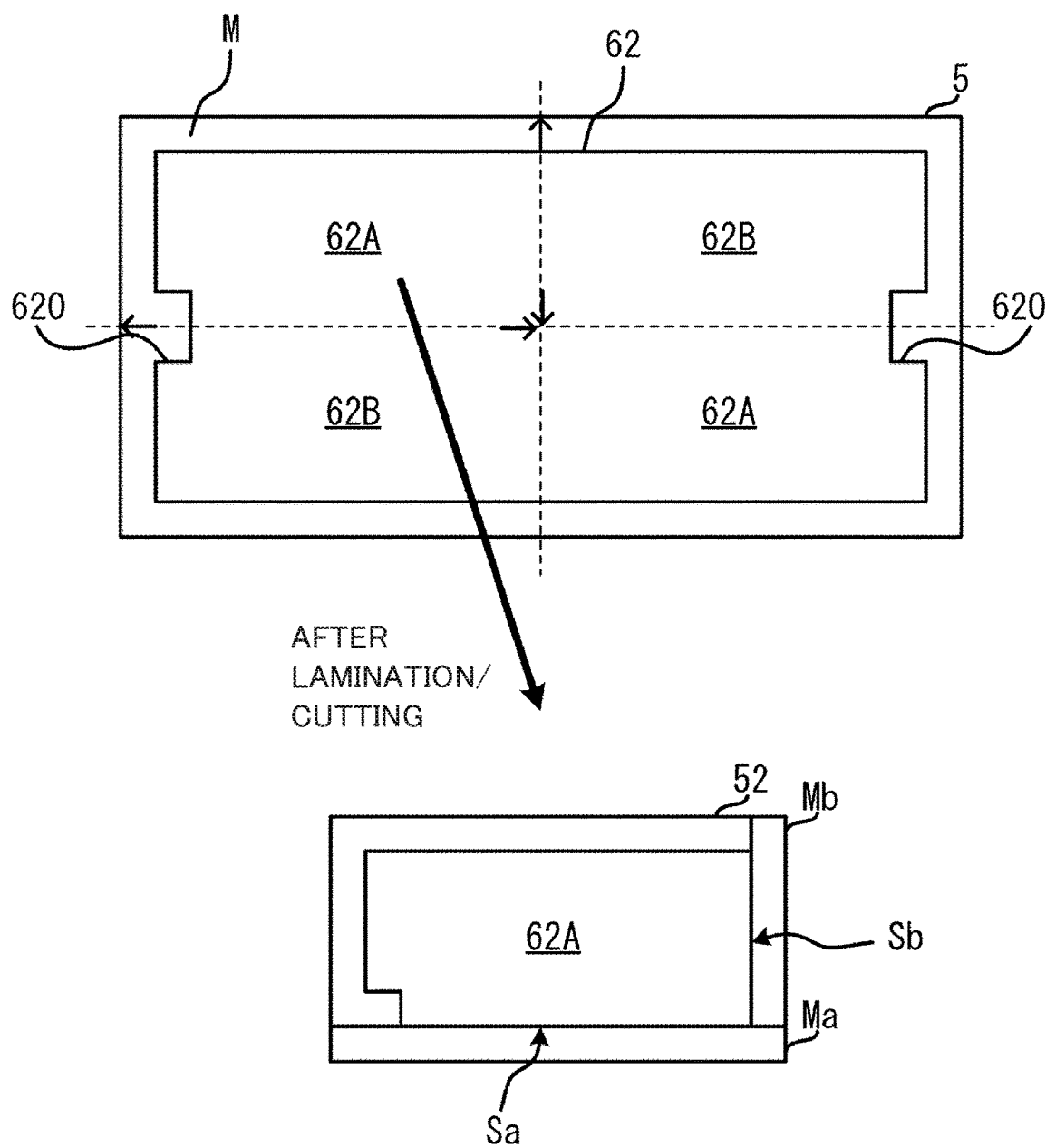
FIG. 12 is a plan view illustrating another example of a dielectric green sheet on which internal electrode patterns are printed.

FIG. 12 is a plan view illustrating another example of the dielectric green sheet 5 on which internal electrode patterns 62A and 62B are printed. In FIG. 12, the same components as those in FIG. 10 are denoted by the same reference numerals, and the description thereof is omitted.

A two-sided adjacent pattern 62 including two sets of internal electrode patterns 62A and 62B is printed on the dielectric green sheet 5. The internal electrode patterns 62A and 62B have the same shape as the internal electrode patterns 60A and 60B, respectively. In the two-sided adjacent pattern 62, the internal electrode patterns 62A and 62B are adjacent to each other so as to share two sides indicated by the arrows. The margin portion M in which the dielectric is exposed is not provided in the adjacent portion.

Further, the two-sided adjacent pattern 62 has a rectangular cutout 620. The cutout 620 corresponds to the corner portion 20ba of the internal electrode layer 2 obtained from each of the internal electrode patterns 62A and 62B.

The internal electrode pattern 62A and the internal electrode pattern 62B are different from each other in the position of the cutout 620 in the substantially rectangular shape. Therefore, when the multilayer chip 10 is formed in the laminating step St3, the internal electrode patterns 62A and 62B are alternately laminated. Thus, the corner portions 20ba of the internal electrode layer 2 are alternately provided at one end of the side 2A on the lower surface 10A side along the laminating direction of the multilayer chip 10.

A reference numeral 52 denotes a dielectric layer of the internal electrode pattern 62A after a plurality of dielectric green sheets 5 are laminated and cut in units of multilayer chips 10. On the cut surfaces Sa and Sb corresponding to the two sides shared with the other internal electrode pattern 62B, side margin portions Ma and Mb having a height and a predetermined thickness in accordance with the multilayer chip 10 are respectively bonded, as in the case of the one-sided adjacent pattern 61.

Figure 13:
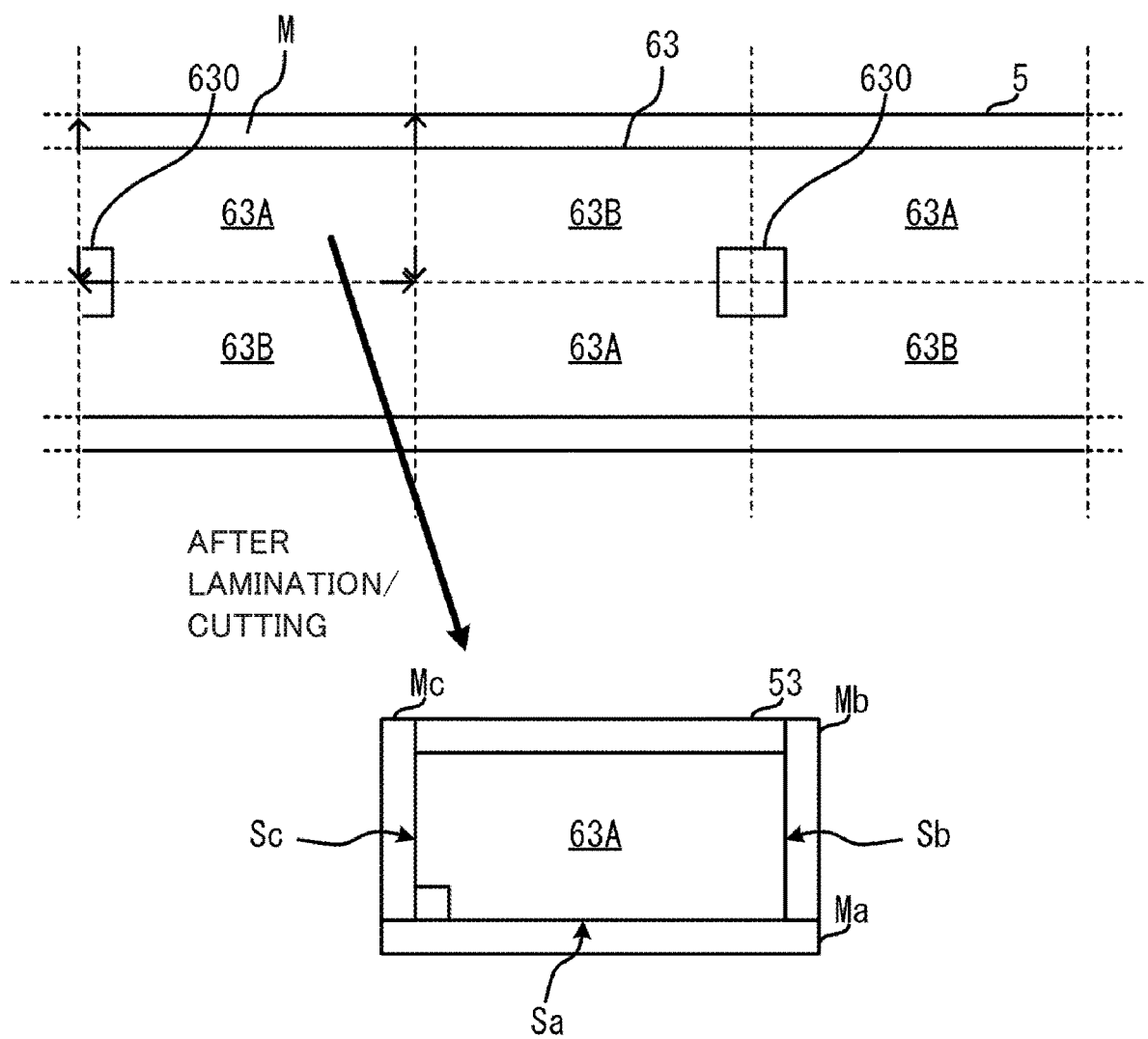
FIG. 13 is a plan view illustrating another example of a dielectric green sheet on which internal electrode patterns are printed.

FIG. 13 is a plan view illustrating another example of the dielectric green sheet 5 on which internal electrode patterns 63A and 63B are printed. In FIG. 13, the same components as those in FIG. 10 are denoted by the same reference numerals, and the description thereof is omitted.

On the dielectric green sheet 5, three-sided adjacent patterns 63 in which a plurality of sets of internal electrode patterns 63A and 63B are arranged in a predetermined direction are printed. The internal electrode patterns 63A and 63B have the same shape as the internal electrode patterns 60A and 60B, respectively. In the three-sided adjacent pattern 63, internal electrode patterns 63A and 63B are alternately arranged, and each internal electrode pattern 63A and 63B is adjacent to each other so as to share three sides indicated by arrows. The margin portion M in which the dielectric is exposed is not provided in the adjacent portion.

Further, the three-sided adjacent pattern 63 has a square cutout 630. The cutout 630 corresponds to the corner portion 20ba of the internal electrode layer 2 obtained from each of the internal electrode patterns 63A and 63B.

The internal electrode pattern 63A and the internal electrode pattern 63B differ from each other in the position of the cutout 630 in the substantially rectangular shape. Therefore, when the multilayer chip 10 is formed in the laminating step St3, the internal electrode patterns 63A and 63B are alternately laminated. Thus, the corner portions 20ba of the internal electrode layer 2 are alternately provided at one end of the side 2A on the lower surface 10A side along the laminating direction of the multilayer chip 10.

A reference numeral 53 denotes a dielectric layer of the internal electrode pattern 63A after the plurality of dielectric green sheets 5 are laminated and cut in units of multilayer chips 10. On cut planes Sa, Sb, and Sc corresponding to the three sides shared with the other internal electrode pattern 63B, side margin portions Ma, Mb, and Mc having a height and a predetermined thickness in accordance with the multilayer chip 10 are respectively bonded, as in the case of the one-sided adjacent pattern 61.

Figure 14:
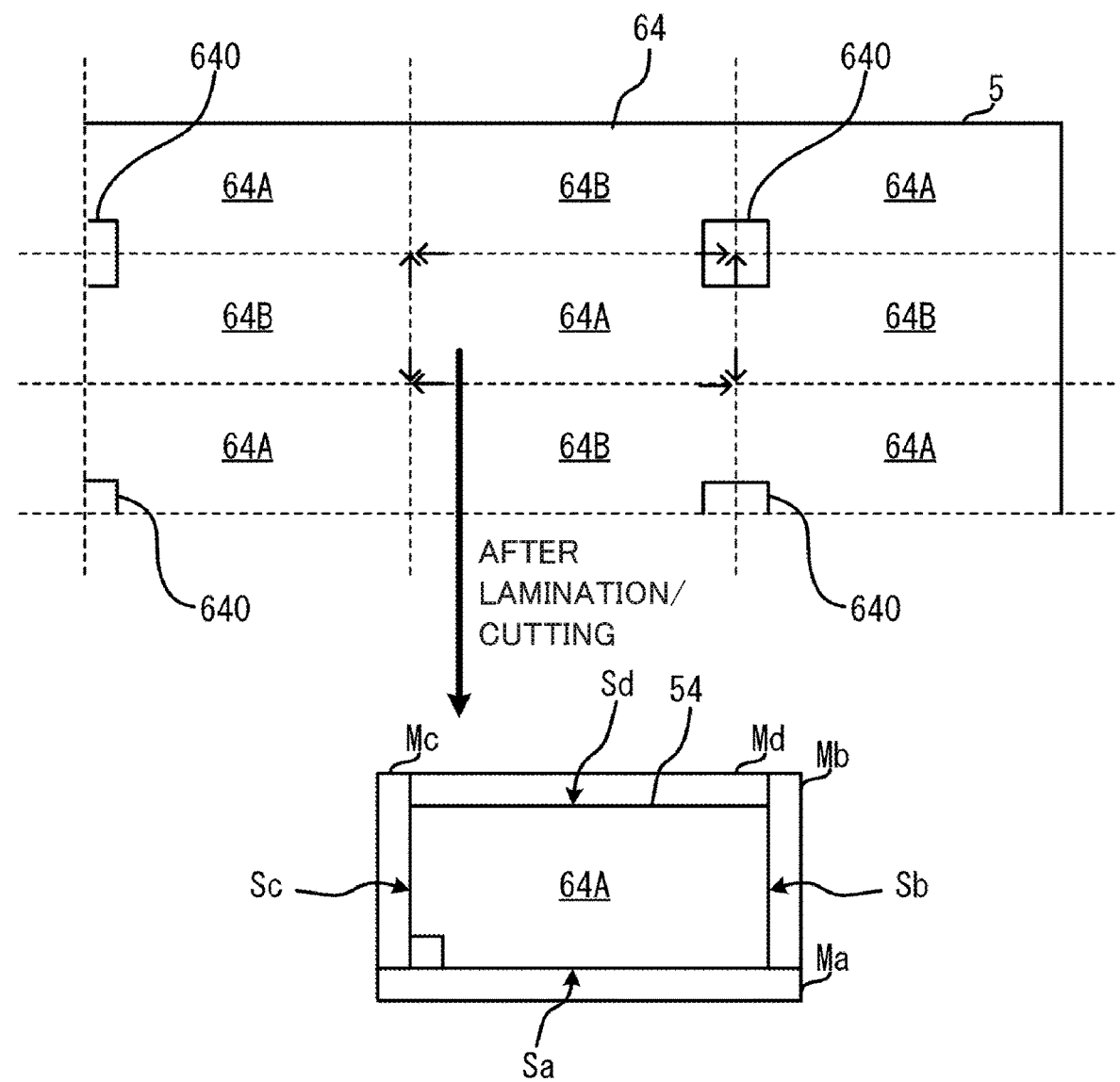
FIG. 14 is a plan view illustrating another example of a dielectric green sheet on which internal electrode patterns are printed.

FIG. 14 is a plan view illustrating another example of the dielectric green sheet 5 on which internal electrode patterns 64A and 64B are printed. In FIG. 14, the same components as those in FIG. 10 are denoted by the same reference numerals, and the description thereof is omitted.

On the dielectric green sheet 5, four-sided adjacent patterns 64 in which internal electrode patterns 64A and 64B are alternately arranged in vertical and horizontal directions are printed. The internal electrode patterns 64A and 64B have the same shape as the internal electrode patterns 60A and 60B, respectively. In the four-sided adjacent pattern 64, the internal electrode patterns 64A and 64B are adjacent to each other so as to share four sides indicated by the arrows. The margin portion M in which the dielectric is exposed is not provided in the adjacent portion.

Further, the four-sided adjacent pattern 64 has a square cutout 640. The cutout 640 corresponds to the corner portion 20ba of the internal electrode layer 2 obtained from each of the internal electrode patterns 64A and 64B.

The internal electrode pattern 64A and the internal electrode pattern 64B differ from each other in the position of the cutout 640 in the substantially rectangular shape. Therefore, when the multilayer chip 10 is formed in the laminating step St3, the internal electrode patterns 64A and 64B are alternately laminated. Thus, the corner portions 20ba of the internal electrode layer 2 are alternately provided at one end of the side 2A on the lower surface 10A side along the laminating direction of the multilayer chip 10.

Thus, in the internal electrode printing step St2, the cut-out corner portions 20b are formed in the internal electrode patterns 60A-64A and 60B-64B so as not to contact the external electrodes 4a and 4b.

A reference numeral 54 denotes a dielectric layer of the internal electrode pattern 64A after a plurality of dielectric green sheets 5 are laminated and cut in units of multilayer chips 10. On cut surfaces Sa, Sb, Sc, Sd corresponding to the two sides shared with the other internal electrode pattern 64B, side margin portions Ma, Mb, Mc, Md having a height and a predetermined thickness in accordance with the multilayer chip 10 are respectively bonded as in the case of the one-sided adjacent pattern 61.

Next, an example of another cutout shape will be described. The following example describes the three-sided adjacent pattern 63, but the following cutout shape can be used for other adjacent patterns.

Figure 15:
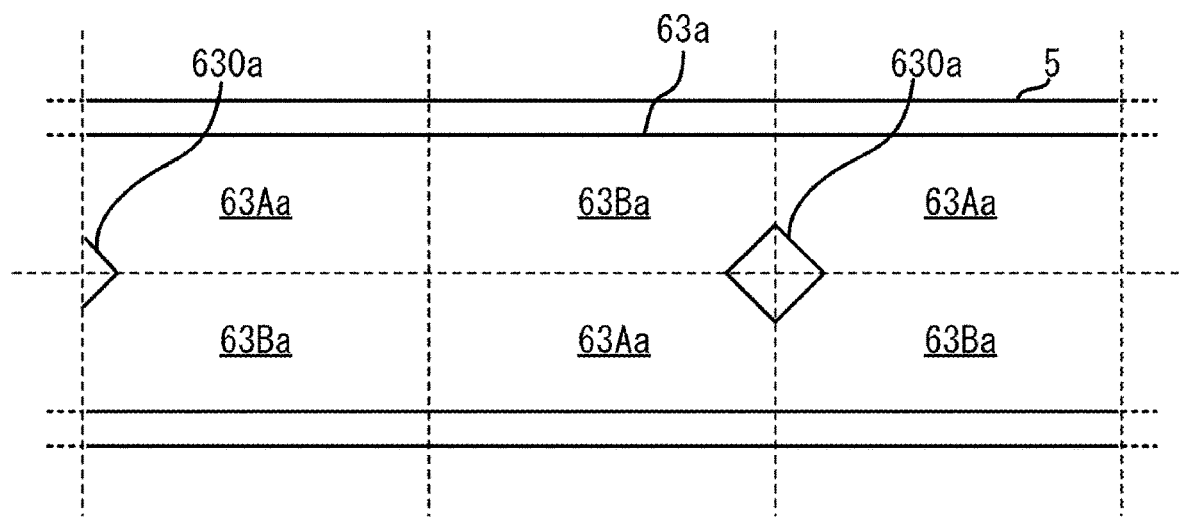
FIG. 15 is a plan view illustrating an example of a dielectric green sheet having a cutout shape of a diamond shape.

FIG. 15 is a plan view illustrating an example of the dielectric green sheet 5 in which the cutout shape is a diamond shape. In FIG. 15, the same components as those in FIG. 13 are denoted by the same reference numerals, and the description thereof is omitted.

On the dielectric green sheet 5, three-sided adjacent patterns 63a in which a plurality of sets of internal electrode patterns 63Aa and 63Ba are arranged in a predetermined direction are printed. The internal electrode patterns 63Aa and 63Ba have the same shape as the internal electrode patterns 60A and 60B, respectively. In the three-sided adjacent pattern 63a, the internal electrode patterns 63Aa and 63Ba are alternately arranged, and each of the internal electrode patterns 63Aa and 63Ba shares three sides with the adjacent internal electrode patterns 63Ba and 63Aa.

Further, the three-sided adjacent pattern 63a has a diamond-shaped cutout 630a. Therefore, the internal electrode layer 2 having the corner portion 20b having a triangular cutout shape as illustrated in FIG. 2 is obtained from each of the internal electrode patterns 63Aa and 63Ba.

Figure 16:
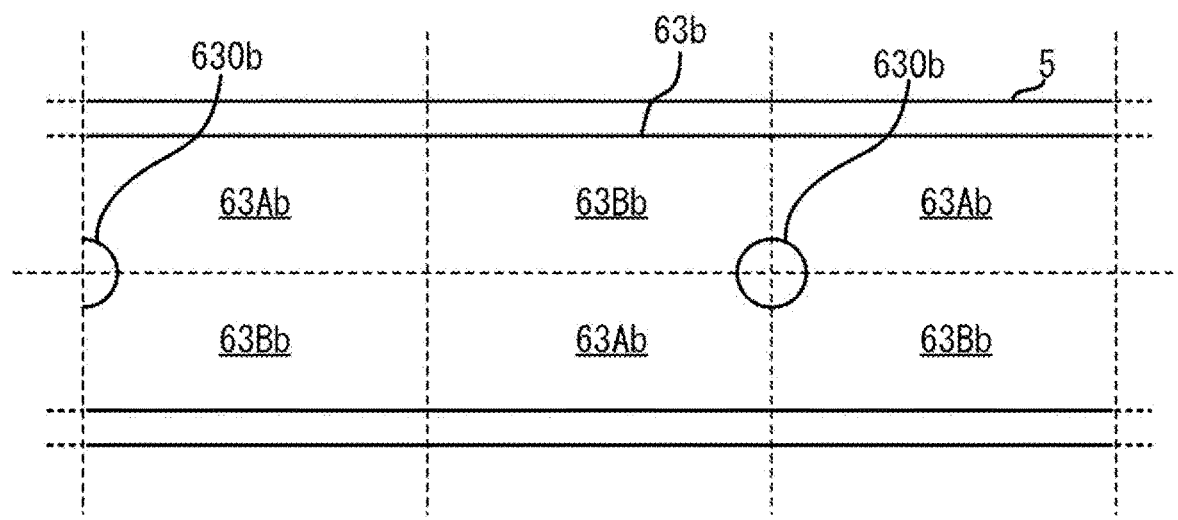
FIG. 16 is a plan view illustrating an example of a dielectric green sheet having a round cutout shape.

FIG. 16 is a plan view illustrating an example of the dielectric green sheet 5 having a round cutout shape. In FIG. 16, the same components as those in FIG. 13 are denoted by the same reference numerals, and the description thereof is omitted.

On the dielectric green sheet 5, three-sided adjacent patterns 63b in which a plurality of sets of internal electrode patterns 63Ab and 63Bb are arranged in a predetermined direction are printed. The internal electrode patterns 63Ab and 63Bb have the same shape as the internal electrode patterns 60A and 60B, respectively. In the three-sided adjacent pattern 63b, the internal electrode patterns 63Ab and 63Bb are alternately arranged, and each of the internal electrode patterns 63Ab and 63Bb shares three sides with adjacent internal electrode patterns 63Bb and 63Ab.

The three-sided adjacent pattern 63b has a round cutout 630b. Therefore, the internal electrode layer 2 having the corner portion 20Bb having the fan-shaped cutout as illustrated in FIG. 7 is obtained from each of the internal electrode patterns 63Ab and 63Bb.

Figure 17:
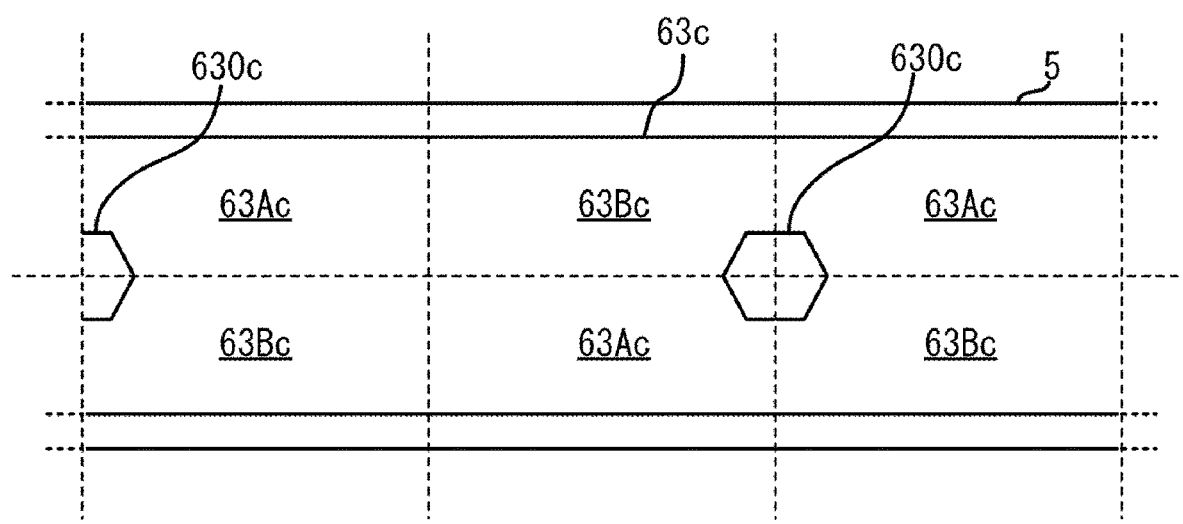
FIG. 17 is a plan view illustrating an example of a dielectric green sheet having a hexagonal cutout shape.

FIG. 17 is a plan view illustrating an example of the dielectric green sheet 5 having a hexagonal cutout shape. In FIG. 17, the same components as those in FIG. 13 are denoted by the same reference numerals, and the description thereof is omitted.

On the dielectric green sheet 5, a three-sided adjacent pattern 63c in which a plurality of sets of internal electrode patterns 63Ac and 63Bc are arranged in a predetermined direction is printed. The internal electrode patterns 63Ac and 63Bc have the same shape as the internal electrode patterns 60A and 60B, respectively. In the three-sided adjacent pattern 63c, the internal electrode patterns 63Ac and 63Bc are alternately arranged, and each of the internal electrode patterns 63Ac and 63Bc shares three sides with adjacent internal electrode patterns 63Bc and 63Ac.

The three-sided adjacent pattern 63c has a hexagonal cutout 630c. Therefore, the internal electrode layer 2 having the corner portion 20bc having the trapezoidal cutout shape as illustrated in FIG. 8 is obtained from each of the internal electrode patterns 63Ac and 63Bc.
(Laminating Step)

Referring again to FIG. 9, after the internal electrode printing step St2, the laminating step St3 is performed. In the laminating step St3, the dielectric green sheets 5 on which the internal electrode patterns 60A-64A and 60B-64B are printed are laminated to form the multilayer chip 10 having a substantially rectangular parallelepiped shape. As described above, the internal electrode patterns 60A to 64A and the internal electrode patterns 60B to 64B are alternately laminated along the laminating direction. Individual multilayer chips 10 are obtained by cutting the laminated dielectric green sheets 5 along the above dotted lines.
(Polishing Step)

Next, a polishing step St4 is performed. In the polishing step St4, the multilayer chip 10 is polished by a method such as barrel polishing. As a result, the corner portion 100a of the multilayer chip 10 is rounded in an arc shape projecting outward, and the corner portion 20a of each internal electrode layer 2 is rounded in an arc shape projecting outward to be exposed at the corner portions 100a of the multilayer chip 10. The outer edges of the corner portions 100a and 100b are not limited to the arc shape and may have other rounded shapes.
(Sintering Step)

Next, a sintering step St5 is performed. In the sintering step St5, the multilayer chip 10 is debinded in an $N_2$ atmosphere of 250 to 500° C. and then sintered at 1100 to 1300° C. for 10 minutes to 2 hours in a reducing atmosphere of an oxygen partial pressure of $10^{-8}$ to $10^{-13}$ atm, whereby the respective particles in the multilayer chip 10 are sintered.
(Reoxidation Treatment Step)

Next, a re-oxidation treatment step St6 is performed. In the re-oxidation treatment step St6, re-oxidation treatment is performed at 600 to 1000° C. in an $N_2$ gas atmosphere.
(External Electrode Forming Step)

Next, an external electrode forming step St7 is performed. In the external electrode forming step St7, a metal paste containing metal powder, glass frit, binder and solvent is applied to the corner portions 100a and 100b of the multilayer chip 10 and dried. As a result, the external electrodes 4a and 4b are formed. Here, the external electrodes 4a and 4b are formed so as to be longer than the radius R, for example, by 10 μm in the X-axis direction and the Y-direction when the laminating direction of the multilayer chip 10 is viewed from front. The binder and the solvent are evaporated by baking. As a means for applying the metal paste, for example, a sputtering method and a dip method can be used as described below.

Figure 18:
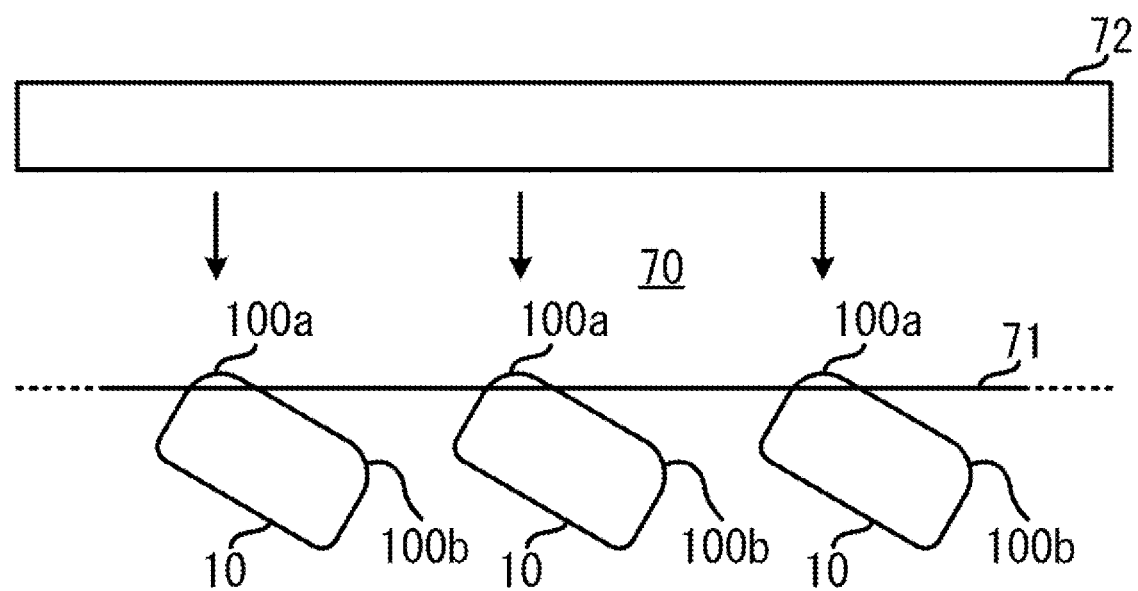
FIG. 18 is a diagram illustrating an example of a method of forming the external electrodes by a sputtering method.

FIG. 18 is a diagram illustrating an example of a method for forming the external electrodes 4a and 4b by the sputtering method. In a vacuum chamber 70 of a sputtering apparatus, a plurality of multilayer chips 10 are held in an inclined attitude on a transfer jig 71. At this time, the corner portion 100a of each multilayer chip 10 is exposed from the transfer jig 71 to an ion emitter 72.

As an example, the ion emitter 72 emits Ni ions to the corner portion 100a of each multilayer chip 10. As a result, a Ni film is formed on the corner portion 100a as the external electrode 4a or 4b. Similarly to the corner portion 100a, a Ni film is formed on the other corner portion 100b as the external electrode 4a or 4b. The method of sputtering is not limited to ion beam sputtering as in this example, and a magnetron system may be used.

Figure 19:
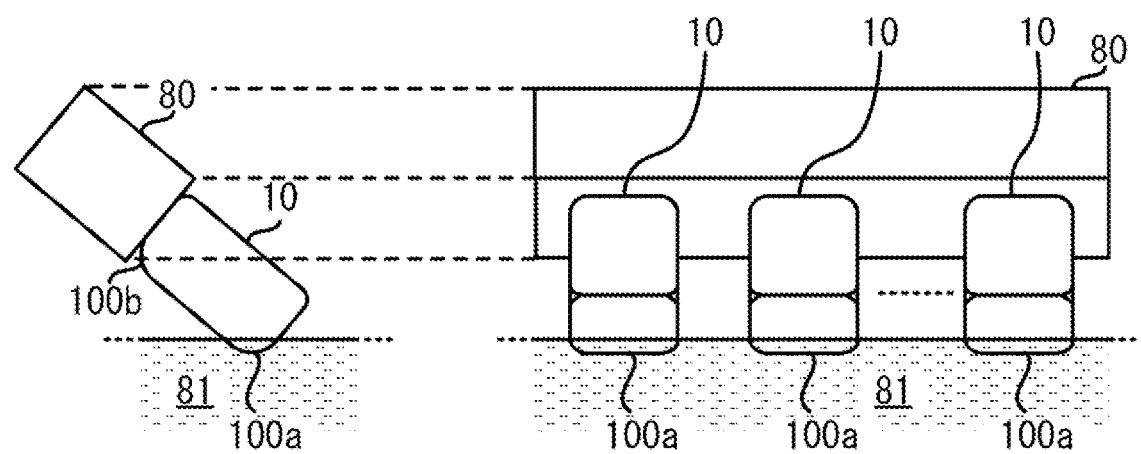
FIG. 19 is a diagram illustrating an example of a method of forming the external electrodes by a dip method.

FIG. 19 is a diagram illustrating an example of a method of forming the external electrodes 4a and 4b by the dip method. A metal paste 81 is stored in a dip tank. A holding device 80 holds a plurality of multilayer chips 10 arranged in one direction. The holding device 80 moves so that the corner portion 100a of each multilayer chip 10 is immersed in the metal paste. Thus, the metal paste is applied to the corner portion 100a to form the external electrodes 4a and 4b. Similarly to the corner portion 100a, the other corner portion 100b is also coated with the metal paste. When the dip method is used, the external electrode forming step St7 may be performed by the dip method before the sintering step St5.
(Plating Treatment Step)

Referring again to FIG. 9, a plating treatment step St8 is performed after the external electrode forming step St7. In the plating treatment step St8, a metal coating of Cu, Ni, Sn or the like is performed on the external electrodes 4a and 4b by a plating treatment. The thickness of the plating may be, for example, about 3 μm. The above steps complete the above-mentioned multilayer ceramic capacitors 1 and 1a.

According to the manufacturing process of the multilayer ceramic capacitors 1, 1a to 1c, the same effect as that of the multilayer ceramic capacitors 1, 1a to 1c can be obtained.

Example

Next, evaluation results of the multilayer ceramic capacitor 1 according to the embodiment will be described.

TABLE 1

| No. | d (μm) | R (μm) | PEELING RATE (%) | SIZE RELATION of e, f, g | SHORT-CIRCUIT OCCURRENCE RATE (%) | EXTERNAL ELECTRODE LENGTH (μm) | EVALUATION RESULT |
|---|---|---|---|---|---|---|---|
| 1 | — | — | 81 | — | 0 | 300 | poor |
| 2 | 15 | 55.0 | 0 | g < e, g < f | 77 | 86.39 | good |
| 3 | 19 | 55.0 | 0 | g < e, g < f | 8 | 86.39 | good |
| 4 | 20 | 100 | 1 | g > e, g > f | 0 | 157.08 | good |
| 5 | 20 | 52.5 | 0 | g < e, g < f | 0 | 82.47 | excellent |

TABLE 1-continued

| No. | d (μm) | R (μm) | PEELING RATE (%) | SIZE RELATION of e, f, g | SHORT-CIRCUIT OCCURRENCE RATE (%) | EXTERNAL ELECTRODE LENGTH (μm) | EVALUATION RESULT |
|---|---|---|---|---|---|---|---|
| 6 | 20 | 55.0 | 0 | g < e, g < f | 0 | 86.39 | excellent |
| 7 | 20 | 87.4 | 0 | g = e = f | 0 | 137.29 | excellent |

(Peeling Rate and Short Circuit Occurrence Rate)

Table 1 illustrates evaluation results of the multilayer ceramic capacitors 1 and 9. In the evaluation, 100 samples of each of No. 1 to No. 6 were used in the test. The No. 1 sample is the multilayer ceramic capacitor 9 (see FIG. 4) of the above example for comparison (hereinafter referred to as comparative example), and No. 2 to No. 7 samples are the multilayer ceramic capacitor 1 of examples.

In the evaluation, a peeling test of the external electrodes 4a and 4b was performed. In the external electrodes 4a and 4b, the number of multilayer ceramic capacitors 1 in which the external electrodes 4a and 4b are peeled off by the vibration of 67 Hz of the circuit board among the respective 100 multilayer ceramic capacitors 1 and 9 is expressed as "peeling rate".

In the evaluation, a short-circuit test was performed on the external electrodes 4a and 4b. In the short-circuit test, an occurrence rate (%) of short-circuit between the corner portion 20b of the internal electrode layer 2 having the cutout shape and the external electrodes 4a and 4b among the respective 100 multilayer ceramic capacitors 1 and 9 was examined.

The sizes of the multilayer ceramic capacitors 1 and 9 were set to a 1005 size. The width L1 of the multilayer chip 10 was 1000 μm, and the height H1 of the multilayer chip 10 was 500 μm. The width L2 of the internal electrode layer 2 was 970 μm, and the height H2 of the internal electrode layer 2 was 470 μm. The widths "a" and "b" of the margins of the dielectric layer 3 in the X-axis direction and the Y-axis direction with respect to the internal electrode layer 2 were both 15 μm. The external electrodes 4a and 4b had an average thickness of 2 μm.

The dielectric layer 3 of the multilayer chip 10 contained barium titanate as a main component, the internal electrode layer 2 contained nickel as a main component, and the external electrodes 4a and 4b contained nickel as a main component.

The radius R of the corner portion 100a of the examples was set to a value satisfying "R>3.5×a" with respect to the width a (=b) of the margin of the dielectric layer 3 so that the corner portion 20a of the internal electrode layer 2 was exposed. An external electrode length indicates the length of the outer edge of the external electrode 91 or 92 in contact with the multilayer chip 90 when the laminating direction of the multilayer chip 90 is viewed from front in the case of the sample No. 1, and the length (=e+f+g) of the outer edge of the external electrode 4a or 4b in contact with the multilayer chip 10 when the laminating direction of the multilayer chip 90 is viewed from front in the case of the samples No. 2 to No. 7.

(Sample No. 1)

The external electrode length was set to 300 μm. As described above, since the external electrodes 91 and 92 of the multilayer ceramic capacitor 9 are provided on the lower surface 90A of the multilayer chip 90, the stresses Fv cannot be dispersed and are concentrated in the Z-axis direction. Therefore, the peeling rate was the highest among the samples No. 1 to No. 7. Since the internal electrode layer 93 of the multilayer ceramic capacitor 9 is connected to the external electrode 91 or 92 via the lead portion 930, the distance between the external electrode 91 or 92 and the internal electrode layer 93 to be disconnected is larger than a corresponding distance of the samples No. 2 to No. 7 of the examples. Therefore, a short circuit did not occur between the external electrode 91 or 92 and the internal electrode layer 93 to be disconnected. However, since the peeling rate was high, the evaluation result was "poor".

(Sample No. 2)

The minimum distance d between the corner portion 20b and the external electrode 4b was set to 15 μm. The radius R of bending of the corner portion 20a was set to 55 μm. The length of the outer edge of the corner portion 100a was set so as to satisfy "g<e" and "g<f". The external electrode length was set to 86.39 λm. In the samples No. 1 to No. 7, the radius R was small and the exposed outer edge "g" of the internal electrode layer 2 in the corner portion 100a was shorter than the outer edges "e, f" of both sides thereof, so that the peeling ratio was 0%. However, since the minimum interval d was the smallest among the samples No. 1 to No. 7, the short-circuit occurrence rate was 77%. Therefore, the evaluation result was "good".

(Sample No. 3)

The minimum distance d between the corner portion 20b and the external electrode 4b was 19 μm. The radius R of bending of the corner portion 20a was set to 55 μm. The length of the outer edge of the corner portion 100a was set so as to satisfy "g<e" and "g<f". The external electrode length was set to 86.39 μm. The radius R of the sample No. 3 was small among the samples No. 1 to No. 7, and the exposed outer edge "g" of the internal electrode layer 2 in the corner portion 100a was shorter than the outer edges "e, f" of both sides thereof, so that the peeling ratio was 0%. However, since the minimum interval d of the sample No. 3 was small among the samples No. 1 to No. 7, the short-circuit occurrence rate was 8%. Therefore, the evaluation result was "good".

(Sample No. 4)

The minimum distance d between the corner portion 20b and the external electrode 4b was set to 20 μm. The radius R of bending of the corner portion 20a was set to 100 μm. The length of the outer edge of the corner portion 100a was set so as to satisfy "g>e" and "g>f". The external electrode length was set to 157.08 μm. The radius R of the sample No. 4 was large among the samples No. 1 to No. 7, and the outer edge "g" exposed to the internal electrode layer 2 at the corner portion 100a was longer than the outer edges "e, f" of both sides thereof, so that the contact area between the external electrode 4a and the dielectric layer 3 was reduced and the bonding strength between the external electrode 4a and the multilayer chip 10 was weakened. Since the length of the external electrodes of the sample No. 4 was long among the samples No. 1 to No. 7, the magnitude of stresses applied to the external electrodes 4a and 4b increased. Therefore, the peeling rate was 1%. However, since the minimum interval d of the sample No. 4 was large among the samples No. 1 to No. 7, the short-circuit occurrence rate was 0%. Therefore, the evaluation result was "good".

(Sample No. 5)

The minimum distance d between the corner portion 20b and the external electrode 4b was set to 20 µm. The radius R of bending of the corner portion 20a was set to 52.5 µm. The length of the outer edge of the corner portion 100a was set so as to satisfy "g<e" and "g<f". The external electrode length was set to 82.47 µm. The radius R of the sample No. 5 was small among the samples No. 1 to No. 7, and the exposed outer edge "g" of the internal electrode layer 2 in the corner portion 100a was shorter than the outer edges "e, f" of both sides thereof, so that the peeling ratio was 0%. Since the minimum interval d of the sample No. 5 was large among the samples No. 1 to No. 7, the short-circuit occurrence rate was 0%. Therefore, the evaluation result was "excellent".

(Sample No. 6)

The minimum distance d between the corner portion 20b and the external electrode 4b was set to 20 µm. The radius R of bending of the corner portion 20a was set to 55 µm. The length of the outer edge of the corner portion 100a was set so as to satisfy "g<e" and "g<f". The external electrode length was set to 86.39 µm. The radius R of the sample No. 6 was small among the samples No. 1 to No. 7 and the exposed outer edge "g" of the internal electrode layer 2 in the corner portion 100a was shorter than the outer edges "e, f" of both sides thereof, so that the peeling ratio was 0%. Since the minimum interval d of the sample No. 6 was large among the samples No. 1 to No. 7, the short-circuit occurrence rate was 0%. Therefore, the evaluation result was "excellent".

(Sample No. 7)

The minimum distance d between the corner portion 20b and the external electrode 4b was set to 20 µm. The radius R of bending of the corner portion 20a was set to 87.4 µm. The length of the outer edge of the corner portion 100a was set so as to satisfy "g=e=f". The external electrode length was set to 137.29 µm. The radius R of the sample No. 7 was large among the samples No. 1 to No. 7, but the exposed outer edge "g" of the internal electrode layer 2 in the corner portion 100a was the same as the outer edges "e, f" of both sides thereof, so that the peeling ratio was 0%. Since the minimum interval d of the sample No. 7 was large among the samples No. 1 to No. 7, the short-circuit occurrence rate was 0%. Therefore, the evaluation result was "excellent".

As described above, with regard to the lengths "g, e, f" of the outer edge of the corner portion 100a, the length "g" of the outer edge to be exposed to the corner portion 20a among the outer edges of the corner portion 100a covered with the external electrode 4a when the laminating direction of the multilayer chip 10 is viewed from front is set to be equal to or less than the lengths "e, f" of the other outer edges on both sides of the outer edge, so that the peeling rate of the external electrode 4a can be more suitably suppressed.

Further, when the radius R of the corner portion 100a is 52.5 to 100 µm, the peeling rate of the external electrode 4a can be more suitably suppressed. Furthermore, since the peeling ratio of the sample No. 4 having the radius R of 100 µm is 1%, it is understood that the smaller the radius R is, the smaller the peeling ratio is, which is preferable.

With respect to the short-circuit occurrence rate, when the minimum interval d is 15 µm or more, the short-circuit occurrence rate can be suppressed to 77% or less. Furthermore, when the minimum distance d is 19 µm or more, the short-circuit occurrence rate can be suppressed to 8% or less, and preferably when the minimum distance d is 20 µm or more, the short-circuit occurrence rate can be suppressed to 0% or less. Thus, the short-circuit occurrence rate is improved as the minimum interval d is larger.

(Evaluation of Capacitance)

Next, the result of evaluating the capacitance of the multilayer ceramic capacitor 1 in comparison with that of the multilayer ceramic capacitor 9 of the comparative example is illustrated.

TABLE 2

|  | HEIGHT H1: 500 (µm) | | HEIGHT H1: 180 (µm) | |
| --- | --- | --- | --- | --- |
|  | COMPARATIVE EXAMPLE | EXAMPLE | COMPARATIVE EXAMPLE | EXAMPLE |
| EFFECTIVE CAPACITANCE AREA PER UNIT HEIGHT (mm$^2$) | 822.26 | 909.49 | 661.36 | 801.91 |
| CAPACITANCE RATIO | 100 | 107.73 | 100 | 121.25 |

Table 2 illustrates an effective capacitance area per unit height and a capacitance ratio of the 1005 size multilayer ceramic capacitors 1 and 9 when the height H1 is 500 µm and when the height H1 is 180 µm. The height of the multilayer ceramic capacitor 9 in the comparative example is the height of the multilayer chip 90 excluding the thickness of the external electrodes 91 and 92.

The effective capacitance area was calculated by dividing the areas of the internal electrode layers 2 and 93 when the laminating direction is viewed from front by the height H1. When the height H1 was 500 µm, the effective capacitance area of the example was about 1.11 times that of the comparative example. When the height H1 was 180 µm, the effective capacitance area of the example was about 1.21 times that of the comparative example. This is because, as described above, since the internal electrode layer 2 of the multilayer ceramic capacitor 1 of the example does not have the lead portion 930 unlike the multilayer ceramic capacitor 9 of the comparative example, the area of the internal electrode layer 2 is increased by that amount.

With respect to the capacitance ratio, the capacitance ratio of the multilayer ceramic capacitor 1 of the example was calculated on the basis that the capacitance ratio of the multilayer ceramic capacitor 9 of the comparative example was 100%. The capacitance ratio of the multilayer ceramic capacitor 1 of the example is larger by 7.73% than that of the comparative example when the height H1 is 500 µm and larger by 21.25% than that of the comparative example when the height H1 is 180 µm, in accordance with the ratio of the effective capacitance area. Thus, according to the multilayer ceramic capacitor 1 of the example, the capacitance can be increased as compared with the multilayer ceramic capacitor 9 of the comparative example.

Although the embodiments of the present disclosure have been described in detail above, the present disclosure is not limited to the specific embodiments, and various modifications and changes can be made within the scope of the gist of the present disclosure described in the claims.

What is claimed is:

1. A ceramic electronic component comprising:
a multilayer body having a substantially rectangular parallelepiped shape including a plurality of internal electrode layers and a plurality of dielectric layers alternately laminated; and
a pair of external electrodes covering each of a pair of first corner portions extending between one surface and a pair of opposing surfaces adjacent to the one surface out of four surfaces of the multilayer body excluding both end surfaces in a laminating direction of the multilayer body;
wherein the pair of first corner portions each have an arc shape projecting outward when the laminating direction of the multilayer body is viewed from front,
each of the plurality of internal electrode layers has a substantially rectangular outer edge when the laminating direction of the multilayer body is viewed from front,
each of the plurality of internal electrode layers includes an arc-shaped second corner portion exposed to one of the pair of first corner portions so as to be in contact with one of the pair of external electrodes, the arc-shaped second corner portion being positioned at one end of a side alongside the one surface of four sides forming the substantially rectangular outer edge, and
a center angle of an arc of the arc-shaped second corner portion is less than 90 degrees.

2. The ceramic electronic component as claimed in claim 1, wherein a length of an outer edge, where the second corner is exposed, of one of the pair of first corner portions covered with one of the pair of external electrodes when the laminating direction of the multilayer body is viewed from front is equal to or less than a length of another outer edge on both sides of the outer edge.

3. The ceramic electronic component as claimed in claim 1, wherein
the pair of first corner portions are curved in an arc shape when the laminating direction of the multilayer body is viewed from front.

4. The ceramic electronic component as claimed in claim 3, wherein
a radius of each of the pair of first corner portions is 52.5 to 100 μm.

5. The ceramic electronic component as claimed in claim 3, wherein
a radius of each of the pair of first corner portions is 30% or less of a height of the multilayer body having the one surface as a bottom surface.

6. The ceramic electronic component as claimed in claim 1, wherein
a radius of curvature of each of the pair of first corner portions is 10 to 20% of a height of the multilayer body having the one surface as a bottom surface.

7. The ceramic electronic component as claimed in claim 1, further comprising
a third corner portion cut out at the other end of the side alongside the one surface so as not to contact with the other of the pair of external electrodes.

8. The ceramic electronic component as claimed in claim 7, wherein
a minimum distance between the third corner portion and the other of the pair of external electrodes is 15 μm or more.

9. The ceramic electronic component as claimed in claim 7, wherein
a minimum distance between the third corner portion and the other of the pair of external electrodes is 19 μm or more.

10. The ceramic electronic component as claimed in claim 7, wherein
a minimum distance between the third corner portion and the other of the pair of external electrodes is 20 μm or more.

11. A circuit board comprising:
a multilayer ceramic electronic component mounted on the circuit board;
the multilayer ceramic electronic component including:
a multilayer body having a substantially rectangular parallelepiped shape including a plurality of internal electrode layers and a plurality of dielectric layers alternately laminated; and
a pair of external electrodes covering each of a pair of first corner portions extending between one surface and a pair of opposing surfaces adjacent to the one surface out of four surfaces of the multilayer body excluding both end surfaces in a laminating direction of the multilayer body;
wherein the pair of first corner portions each have an arc shape projecting outward when the laminating direction of the multilayer body is viewed from front,
each of the plurality of internal electrode layers has a substantially rectangular outer edge when the laminating direction of the multilayer body is viewed from front,
each of the plurality of internal electrode layers includes an arc-shaped second corner portion exposed to one of the pair of first corner portions so as to be in contact with one of the pair of external electrodes, the arc-shaped second corner portion being positioned at one end of a side alongside the one surface of four sides forming the substantially rectangular outer edge,
a center angle of an arc of the arc-shaped second corner portion is less than 90 degrees, and
the pair of external electrodes each have a crescent shape along the pair of first corners when the laminating direction of the multilayer body is viewed from front, and are connected to the circuit board by a solder extending along the pair of external electrodes toward the pair of opposing surfaces.

* * * * *